(12) United States Patent
Shimizu

(10) Patent No.: US 8,120,715 B2
(45) Date of Patent: Feb. 21, 2012

(54) TORQUE LIMITER, DISPLAY SCREEN TURNING APPARATUS COMPRISING TORQUE LIMITER AND TELEVISION SET INCLUDING TORQUE LIMITER

(75) Inventor: Daisuke Shimizu, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 421 days.

(21) Appl. No.: 12/428,789

(22) Filed: Apr. 23, 2009

(65) Prior Publication Data
US 2009/0268107 A1 Oct. 29, 2009

(51) Int. Cl.
*H04N 5/64* (2006.01)
(52) U.S. Cl. ........... 348/836; 248/415; 248/418; 464/57
(58) Field of Classification Search .......... 348/836–843; 361/679.06, 679.07, 679.21; 248/415, 418, 248/349.1; 464/40, 57–60; 74/89.18, 406, 74/409, 411, 411.5, 412 R, 413, 414, 421 R, 74/421 A
See application file for complete search history.

(56) References Cited

U.S. PATENT DOCUMENTS

| | | | |
|---|---|---|---|
| 6,381,429 B1 | 4/2002 | Shibata et al. | |
| 2003/0050121 A1* | 3/2003 | Takada et al. | 464/40 |
| 2007/0072686 A1* | 3/2007 | Peot et al. | 464/57 |
| 2008/0015034 A1* | 1/2008 | Downey | 464/39 |
| 2008/0053779 A1 | 3/2008 | Higashitani et al. | |
| 2008/0111929 A1* | 5/2008 | Yokota et al. | 348/836 |
| 2009/0176583 A1* | 7/2009 | Dell et al. | 464/40 |

FOREIGN PATENT DOCUMENTS

| | | |
|---|---|---|
| EP | 1 912 014 A2 | 4/2008 |
| EP | 1912014 A2 * | 4/2008 |
| JP | 53-87365 | 7/1978 |
| JP | 61-79062 U | 5/1986 |
| JP | 63-96311 U | 6/1988 |
| JP | 2-132163 U | 11/1990 |
| JP | 5-15140 U | 2/1993 |
| JP | 6-176444 A | 6/1994 |
| JP | 6-180899 A | 6/1994 |
| JP | 10-14170 A | 1/1998 |
| JP | 3128966 U | 1/2007 |
| JP | 2008-57706 A | 3/2008 |

OTHER PUBLICATIONS

Japanese Office Action dated Sep. 7, 2010 including English translation (Four (4) pages).
Japanese Office Action dated Feb. 9, 2010 including English translation (Four (4) pages).
Extended European Search Report dated Apr. 28, 2010 (six (6) pages).

* cited by examiner

*Primary Examiner* — Brian Glessner
*Assistant Examiner* — Adam Barlow
(74) *Attorney, Agent, or Firm* — Crowell & Moring LLP

(57) ABSTRACT

This torque limiter includes a first rotating member integrally provided with a plurality of fragment portions in a concentric manner and having a spring storage portion enclosed with the plurality of fragment portions, a second rotating member having a lid portion arranged to cover the spring storage portion of the first rotating member and a fit portion fitted with the outer peripheral surfaces of the plurality of fragment portions of the first rotating member and a spring member press-fitted into the spring storage portion enclosed with the inner peripheral surfaces of the plurality of fragment portions of the first rotating member thereby bringing the plurality of fragment portions into pressure contact with the fit portion of the second rotating member, for transmitting driving torque in response to pressure contact force applied by the spring member.

15 Claims, 15 Drawing Sheets

TORQUE LIMITER, DISPLAY SCREEN TURNING APPARATUS COMPRISING TORQUE LIMITER AND TELEVISION SET INCLUDING TORQUE LIMITER

BACKGROUND OF THE INVENTION

1. Field of the Invention

The present invention relates to a torque limiter, a display screen turning apparatus comprising a torque limiter and a television set including a torque limiter.

2. Description of the Background Art

A torque limiter having a spring member is known in general, as disclosed in each of Japanese Utility Model Laying-Open No. 5-15140 (1993), Japanese Patent Laying-Open No. 6-180899 (1994) and Japanese Patent Laying-Open No. 6-176444 (1994), for example.

The aforementioned Japanese Utility Model Laying-Open No. 5-15140 discloses a reel driving apparatus comprising a lower coupling gear, provided with a first boss, receiving power transmitted thereto, an upper coupling gear provided with a second boss into which an upper portion of the first boss is inserted and a clutch spring (spring member) inserted into the first and second bosses and arranged to be held between the lower and upper coupling gears. The reel driving apparatus described in Japanese Utility Model Laying-Open No. 5-15140 is so formed that the clutch spring is wound to transmit power to the upper coupling gear when normal rotation is transmitted to the lower coupling gear. Further, the reel driving apparatus is so formed that the clutch spring is separated not to transmit the power to the upper coupling gear when reverse rotation is transmitted to the lower coupling gear.

The aforementioned Japanese Patent Laying-Open No. 6-180899 discloses a clutch structure comprising a support shaft, a support plate rotatably mounted on the lower end portion of the support shaft, a pulley rotatably arranged so that driving force is transmitted thereto and a friction member arranged between the upper surface of the support plate and the lower surface of the pulley. The clutch structure disclosed in Japanese Patent Laying-Open No. 6-180899 further comprises a clutch gear rotatably mounted on the upper end portion of the support shaft and a coil spring applying urging force between the pulley and the clutch gear. The clutch structure described in Japanese Patent Laying-Open No. 6-180899 is so formed that the pulley is brought into pressure contact with the friction member due to downward urging force of the coil spring so that constant torque is generated when driving force applied to the pulley is transmitted to the support plate through the friction member and the driving force is transmitted to the clutch gear through the support plate and the support shaft.

The aforementioned Japanese Patent Laying-Open No. 6-176444 discloses a felt clutch mechanism comprising a torque generating spring, an upper rotating member pressed downward by the torque generating spring, a felt member coming into contact with the lower surface of a first member and a lower rotating member to which the lower surface of the felt member is bonded/fixed. The felt clutch mechanism described in Japanese Patent Laying-Open No. 6-176444 is so formed that the upper rotating member is brought into pressure contact with a friction member due to downward urging force of the torque generating spring so that constant torque is generated when driving force applied to the lower rotating member is transmitted to the upper rotating member through the friction member and the driving force is transmitted to the upper rotating member.

In the reel driving apparatus described in the aforementioned Japanese Utility Model Laying-Open No. 5-15140, however, only either rotation (normal direction) is transmitted from the lower coupling gear to the upper coupling gear. Therefore, bidirectional rotation cannot be transmitted.

In the clutch structure disclosed in the aforementioned Japanese Patent Laying-Open No. 6-180899, the friction member must be provided separately from the support shaft, the support plate, the pulley and the coil spring, in order to generate the constant torque. Therefore, the number of components is disadvantageously increased.

In the felt clutch mechanism described in the aforementioned Japanese Patent Laying-Open No. 6-176444, the felt member must be provided separately from the upper rotating member, the lower rotating member and the torque generating spring, in order to generate the constant torque. Therefore, the number of components is disadvantageously increased.

SUMMARY OF THE INVENTION

The present invention has been proposed in order to solve the aforementioned problems, and an object of the present invention is to provide a torque limiter capable of transmitting bidirectional rotation while suppressing increase in the number of components.

A torque limiter according to a first aspect of the present invention comprises a first rotating member integrally provided with a plurality of fragment portions in a concentric manner and having a spring storage portion enclosed with the plurality of fragment portions, a second rotating member having a lid portion arranged to cover the spring storage portion of the first rotating member and a fit portion fitted with the outer peripheral surfaces of the plurality of fragment portions of the first rotating member and a spring member press-fitted into the spring storage portion enclosed with the inner peripheral surfaces of the plurality of fragment portions of the first rotating member thereby bringing the plurality of fragment portions into pressure contact with the fit portion of the second rotating member, for transmitting driving torque in response to pressure contact force applied by the spring member.

As hereinabove described, the torque limiter according to the first aspect comprises the first rotating member having the spring storage portion enclosed with the plurality of fragment portions, the second rotating member having the fit portion fitted with the outer peripheral surfaces of the plurality of fragment portions of the first rotating member and the spring member bringing the plurality of fragment portions into pressure contact with the fit portion of the second rotating member for transmitting the driving torque in response to the pressure contact force applied by the spring member, whereby the driving torque responsive to the pressure contact force applied by the spring member can be transmitted while the plurality of fragment portions of the first rotating member and the fit portion of the second rotating member are directly in surface contact with each other by the spring member. Thus, no friction member such as a felt member may be separately provided, whereby increase in the number of components can be suppressed. Further, the torque limiter is so formed as to transmit the driving torque in response to the pressure contact force applied by the spring member, whereby bidirectional rotation can be transmitted since the pressure contact force applied by the spring member has the same magnitude regardless of the direction of rotation of the first and second rotating members. In addition, the plurality of fragment portions of the first rotating member are brought into pressure contact with the fit portion of the second rotating member having the lid portion arranged to cover the spring storage portion into which the spring member is press-fitted so that the second rotating member is fitted with the first rotating member due to the pressure contact, whereby the second rotating member is hardly detached from the first rotating member. Thus, the lid portion of the second rotating member covers the spring storage portion in the state where the second rotating member is fitted with the first rotating member, whereby the spring member can be inhibited from slipping out of the spring storage portion. Dissimilarly to a case where a stop hook is provided on the spring storage portion for inhibiting the spring member from slipping out of the spring storage portion, the spring member may not be press-fitted into the spring storage portion while avoiding a hook when the first rotating member and the spring member are combined with each other, whereby the first rotating member and the spring member can be easily combined with each other.

In the aforementioned torque limiter according to the first aspect, the first rotating member preferably further has a first shaft receiving portion at the center of the first rotating member while the second rotating member preferably further has a second shaft receiving portion provided at the center of the second rotating member to correspond to the first shaft receiving portion, and the torque limiter preferably further comprises a fixed shaft portion inserted into the first shaft receiving portion of the first rotating member and the second shaft receiving portion of the second rotating member for rotatably supporting the first rotating member and the second rotating member. According to this structure, the centers of the first and second rotating members are fixed by the fixed shaft portion dissimilarly to a case where the fixed shaft portion is not inserted into the first or second rotating member, whereby the first and second rotating members do not deviate from ordinary positions even if force is applied to the first or second rotating member from a direction other than that perpendicular to the fixed shaft portion. Thus, nontransmission of the driving torque resulting from deviation of the first or second rotating member from the ordinary position can be suppressed.

In this case, the fixed shaft portion is preferably integrally provided with a first engaging portion, and the second shaft receiving portion is preferably integrally provided with a second engaging portion rotatably engaging with the first engaging portion of the fixed shaft portion. According to this structure, the fixed shaft portion and the second shaft receiving portion so engage with each other as to regulate movement of the second rotating member provided with the second shaft receiving portion in an extensional direction of the fixed shaft portion. The first and second rotating members are pivotally supported by the fixed shaft portion, whereby the extensional direction of the fixed shaft portion and the direction of the second rotating member fitted with the first rotating member are identical to each other. Thus, movement of the second rotating member in the direction fitted with the first rotating member is regulated due to the engagement between the second shaft receiving portion and the fixed shaft portion so that the second rotating member is more hardly detached from the first rotating member, whereby the spring member can be more inhibited from slipping out of the spring storage portion of the first rotating member due to the lid portion of the second rotating member. Further, the fixed shaft portion and the second shaft receiving portion are integrally provided with the first and second engaging portions respectively so that no member for engaging the fixed shaft portion and the second shaft receiving portion with each other may be separately provided, whereby increase in the number of components can be suppressed.

In the aforementioned torque limiter having the second shaft receiving portion provided with the second engaging portion, the first engaging portion is preferably a groove portion peripherally provided on the outer peripheral surface of the fixed shaft portion, and the second engaging portion is preferably a protrusion engaging with the groove portion. According to this structure, the protrusion of the second rotating member can move in the groove portion peripherally provided on the outer peripheral surface of the fixed shaft portion while the second rotating member rotates with respect to the fixed shaft portion, whereby the engaging state between the first and second engaging portions can be easily maintained while rotating the second rotating member with respect to the fixed shaft portion.

In the aforementioned torque limiter having the second engaging portion formed by the protrusion, the second shaft receiving portion is preferably formed to be elastically deformable in a direction where the protrusion separates from the groove portion of the fixed shaft portion. According to this structure, the second rotating member can be easily attached to and detached from the fixed shaft portion by elastically deforming the second shaft receiving portion so that the protrusion separates from the groove portion.

In the aforementioned torque limiter having the second shaft receiving portion formed to be elastically deformable, the second shaft receiving portion preferably includes a pair of notches and an engaging support portion provided with the protrusion and formed to be elastically deformable in a region held between the pair of notches. According to this structure, the engaging support portion provided with the protrusion can be elastically deformed by the pair of notches, whereby the second rotating member can be more easily attached to and detached from the fixed shaft portion.

In the aforementioned torque limiter having the second shaft receiving portion including the engaging support portion, the protrusion of the engaging support portion is preferably formed on a portion of the engaging support portion on a side in an insertion direction for the fixed shaft portion. According to this structure, the quantity of elastic deformation of the engaging support portion can be increased by forming the protrusion on the portion of the engaging support portion on the side in the insertion direction for the fixed shaft portion. Thus, the engaging support portion can be rendered easily elastically deformable in the direction where the protrusion separates from the groove portion of the fixed shaft portion, whereby the second rotating member can be more easily attached to and detached from the fixed shaft portion.

In the aforementioned torque limiter having the second shaft receiving portion including the engaging support portion, an end portion of the engaging support portion on a side in an insertion direction for the fixed shaft portion is preferably so formed as to protrude beyond an end portion on the side in the insertion direction for the fixed shaft portion in a portion of the second shaft receiving portion other than the engaging support portion. According to this structure, a finger or the like can be easily put on the end portion of the engaging support portion, whereby the protrusion can be easily elastically deformed in the direction for separating from the groove portion of the fixed shaft portion. Thus, the second rotating member can be more easily attached to and detached from the fixed shaft portion.

In the aforementioned torque limiter having the second shaft receiving portion including the engaging support portion, an end portion of the engaging support portion on a side in an insertion direction for the fixed shaft portion is preferably so formed as to protrude beyond a forward end portion on the side in the insertion direction for the fixed shaft portion when the fixed shaft portion is inserted into the second shaft receiving portion. According to this structure, a finger or the like can be easily put on the end portion of the engaging support portion also in the state where the fixed shaft portion is inserted into the second shaft receiving portion, whereby the protrusion can be easily elastically deformed in the direction for separating from the groove portion of the fixed shaft portion. Thus, the second rotating member can be more easily detached from the fixed shaft portion.

In the aforementioned torque limiter having the second shaft receiving portion formed to be elastically deformable, a first chamfer is preferably formed on the outer periphery of a forward end portion on a side in an insertion direction for the fixed shaft portion. According to this structure, the protrusion comes into contact with the first chamfer of the fixed shaft portion and is moved outward along the surface of the first chamfer when the fixed shaft portion is inserted into the second shaft receiving portion, whereby the second shaft receiving portion can be easily elastically deformed outward. Thus, the protrusion of the second shaft receiving portion and the groove portion of the fixed shaft portion can smoothly engage with each other.

In the aforementioned torque limiter having the second shaft receiving portion including the engaging support portion, a hole for rendering the engaging support portion deflectable is preferably provided on the outer peripheral surface side of the engaging support portion of the second shaft receiving portion. According to this structure, the second shaft receiving portion can be rendered easily deflectable in the direction for separating from the groove portion of the fixed shaft portion, whereby the second rotating member can be more easily attached to and detached from the fixed shaft portion.

In the aforementioned torque limiter according to the first aspect, the first rotating member preferably integrally includes a driven gear portion, and the second rotating member preferably integrally includes a driving gear portion. According to this structure, the driving torque transmitted to the second rotating member can be easily transmitted from the first rotating member to still another rotating member by the driven gear portion and the driving gear portion.

In the aforementioned torque limiter according to the first aspect, the fit portion of the second rotating member is preferably formed to be fitted with the outer peripheral surfaces of the plurality of fragment portions of the first rotating member from above, and a second chamfer is preferably formed on the inner peripheral surface side of the lower portion of the fit portion. The second rotating member is hardly fitted with the first rotating member having the spring storage portion storing the spring member since the spring member is so formed as to bring the plurality of fragment portions into pressure contact with the fit portion. According to this structure, however, the second chamfer is so formed that the second rotating member can be fitted with the first rotating member by sliding the upper end portions of the plurality of fragment portions on the second chamfer, whereby the second rotating member can be easily fitted with the first rotating member.

In the aforementioned torque limiter according to the first aspect, the fit portion of the second rotating member is preferably formed to be fitted with the outer peripheral surfaces of the plurality of fragment portions of the first rotating member from above, and third chamfers are preferably formed on the outer peripheral surface sides of the upper end portions of the plurality of fragment portions. The second rotating member is hardly fitted with the first rotating member having the spring storage portion storing the spring member since the spring member is so formed as to bring the plurality of fragment portions into pressure contact with the fit portion. According to this structure, however, the third chamfers are so formed that the second rotating member can be fitted with the first rotating member by sliding the lower end portion of the fit portion on the third chamfers, whereby the second rotating member can be easily fitted with the first rotating member.

In the aforementioned torque limiter having the first engaging portion formed by the groove portion and the second engaging portion formed by the protrusion, a surface of the protrusion of the second shaft receiving portion opposed to the bottom surface of the peripheral groove portion of the fixed shaft portion is preferably arcuately formed to correspond to the bottom surface of the peripheral groove portion of the fixed shaft portion. According to this structure, the protrusion of the second shaft receiving portion can be fitted along the bottom surface of the peripheral groove portion of the fixed shaft portion, whereby the protrusion can be more deeply fitted into the groove portion without inhibiting the rotation of the second rotating member with respect to the fixed shaft portion.

A display screen turning apparatus according to a second aspect of the present invention comprises a torque limiter including a first rotating member integrally provided with a plurality of fragment portions in a concentric manner and having a spring storage portion enclosed with the plurality of fragment portions, a second rotating member having a lid portion arranged to cover the spring storage portion of the first rotating member and a fit portion fitted with the outer peripheral surfaces of the plurality of fragment portions of the first rotating member and a spring member press-fitted into the spring storage portion enclosed with the inner peripheral surfaces of the plurality of fragment portions of the first rotating member thereby bringing the plurality of fragment portions into pressure contact with the fit portion of the second rotating member for transmitting driving torque in response to pressure contact force applied by the spring member, for supporting a display screen portion in a turnable manner.

As hereinabove described, the display screen turning apparatus according to the second aspect comprises the first rotating member having the spring storage portion enclosed with the plurality of fragment portions, the second rotating member having the fit portion fitted with the outer peripheral surfaces of the plurality of fragment portions of the first rotating member and the spring member bringing the plurality of fragment portions into pressure contact with the fit portion of the second rotating member for transmitting the driving torque in response to the pressure contact force applied by the spring member, whereby the driving torque responsive to the pressure contact force applied by the spring member can be transmitted while the plurality of fragment portions of the first rotating member and the fit portion of the second rotating member are directly in surface contact with each other by the spring member. Thus, no friction member such as a felt member may be separately provided, whereby increase in the number of components can be suppressed. Further, the display screen turning apparatus is so formed as to transmit the driving torque in response to the pressure contact force applied by the spring member, whereby bidirectional rotation can be transmitted since the pressure contact force applied by the spring member has the same magnitude regardless of the direction of rotation of the first and second rotating members. In addition, the plurality of fragment portions of the first rotating member are brought into pressure contact with the fit portion of the second rotating member having the lid portion arranged to cover the spring storage portion into which the spring member is press-fitted so that the second rotating member is fitted with the first rotating member due to the pressure contact, whereby the second rotating member is hardly detached from the first rotating member. Thus, the lid portion of the second rotating member covers the spring storage portion in the state where the second rotating member is fitted with the first rotating member, whereby the spring member can be inhibited from slipping out of the spring storage portion. Dissimilarly to a case where a stop hook is provided on the spring storage portion for inhibiting the spring member from slipping out of the spring storage portion, the spring member may not be press-fitted into the spring storage portion while avoiding a hook when the first rotating member and the spring member are combined with each other, whereby the first rotating member and the spring member can be easily combined with each other.

In the aforementioned display screen turning apparatus according to the second aspect, the first rotating member preferably further has a first shaft receiving portion at the center of the first rotating member, the second rotating member preferably further has a second shaft receiving portion provided at the center of the second rotating member to correspond to the first shaft receiving portion, and the torque limiter preferably further includes a fixed shaft portion inserted into the first shaft receiving portion of the first rotating member and the second shaft receiving portion of the second rotating member for rotatably supporting the first rotating member and the second rotating member. According to this structure, the centers of the first and second rotating members are fixed by the fixed shaft portion dissimilarly to a case where the fixed shaft portion is not inserted into the first or second rotating member, whereby the first and second rotating members do not deviate from ordinary positions even if force is applied to the first or second rotating member from a direction other than that perpendicular to the fixed shaft portion. Thus, nontransmission of the driving torque resulting from deviation of the first or second rotating member from the ordinary position can be suppressed.

In this case, the fixed shaft portion is preferably integrally provided with a groove portion peripherally provided on the outer peripheral surface of the fixed shaft portion, and the second shaft receiving portion is preferably integrally provided with a protrusion rotatably engaging with the groove portion of the fixed shaft portion. According to this structure, the fixed shaft portion and the second shaft receiving portion so engage with each other as to regulate movement of the second rotating member provided with the second shaft receiving portion in an extensional direction of the fixed shaft portion. The first and second rotating members are pivotally supported by the fixed shaft portion, whereby the extensional direction of the fixed shaft portion and the direction of the second rotating member fitted with the first rotating member are identical to each other. Thus, movement of the second rotating member in the direction fitted with the first rotating member is regulated due to the engagement between the second shaft receiving portion and the fixed shaft portion so that the second rotating member is more hardly detached from the first rotating member, whereby the spring member can be more inhibited from slipping out of the spring storage portion of the first rotating member due to the lid portion of the second rotating member. Further, the fixed shaft portion and the second shaft receiving portion are integrally provided with the groove portion and the protrusion respectively so that no member for engaging the fixed shaft portion and the second shaft receiving portion with each other may be separately provided, whereby increase in the number of components can be suppressed. Further, the protrusion of the second rotating member can move in the groove portion peripherally provided on the outer peripheral surface of the fixed shaft portion while the second rotating member rotates with respect to the fixed shaft portion, whereby the engaging state between the groove portion and the protrusion can be easily maintained while rotating the second rotating member with respect to the fixed shaft portion.

In the aforementioned display screen turning apparatus having the fixed shaft portion provided with the groove portion and the second shaft receiving portion provided with the protrusion, the second shaft receiving portion is preferably formed to be elastically deformable in a direction where the protrusion separates from the groove portion of the fixed shaft portion. According to this structure, the second rotating member can be easily attached to and detached from the fixed shaft portion by elastically deforming the second shaft receiving portion so that the protrusion separates from the groove portion.

A television set according to a third aspect of the present invention comprises a display screen portion displaying a television image and a display screen turning apparatus including a torque limiter including a first rotating member integrally provided with a plurality of fragment portions in a concentric manner and having a spring storage portion enclosed with the plurality of fragment portions, a second rotating member having a lid portion arranged to cover the spring storage portion of the first rotating member and a fit portion fitted with the outer peripheral surfaces of the plurality of fragment portions of the first rotating member and a spring member press-fitted into the spring storage portion enclosed with the inner peripheral surfaces of the plurality of fragment portions of the first rotating member thereby bringing the plurality of fragment portions into pressure contact with the fit portion of the second rotating member for transmitting driving torque in response to pressure contact force applied by the spring member, for supporting the display screen portion in a turnable manner.

As hereinabove described, the television set according to the third aspect comprises the first rotating member having the spring storage portion enclosed with the plurality of fragment portions, the second rotating member having the fit portion fitted with the outer peripheral surfaces of the plurality of fragment portions of the first rotating member and the spring member bringing the plurality of fragment portions into pressure contact with the fit portion of the second rotating member for transmitting the driving torque in response to the pressure contact force applied by the spring member, whereby the driving torque responsive to the pressure contact force applied by the spring member can be transmitted while the plurality of fragment portions of the first rotating member and the fit portion of the second rotating member are directly in surface contact with each other by the spring member. Thus, no friction member such as a felt member may be separately provided, whereby increase in the number of components can be suppressed. Further, the television set is so formed as to transmit the driving torque in response to the pressure contact force applied by the spring member, whereby bidirectional rotation can be transmitted since the pressure contact force applied by the spring member has the same magnitude regardless of the direction of rotation of the first and second rotating members. In addition, the plurality of fragment portions of the first rotating member are brought into pressure contact with the fit portion of the second rotating member having the lid portion arranged to cover the spring storage portion into which the spring member is press-fitted so that the second rotating member is fitted with the first rotating member due to the pressure contact, whereby the second rotating member is hardly detached from the first rotating member. Thus, the lid portion of the second rotating member covers the spring storage portion in the state where the second rotating member is fitted with the first rotating member, whereby the spring member can be inhibited from slipping out of the spring storage portion. Dissimilarly to a case where a stop hook is provided on the spring storage portion for inhibiting the spring member from slipping out of the spring storage portion, the spring member may not be press-fitted into the spring storage portion while avoiding a hook when the first rotating member and the spring member are combined with each other, whereby the first rotating member and the spring member can be easily combined with each other.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structures of a torque limiter and a display screen turning apparatus provided with the torque limiter according to the embodiment of the present invention are described with reference to FIGS. 1 to 17. According to this embodiment, the present invention is applied to the display screen turning apparatus for a liquid crystal display employed as an exemplary television set.

Figure 1:
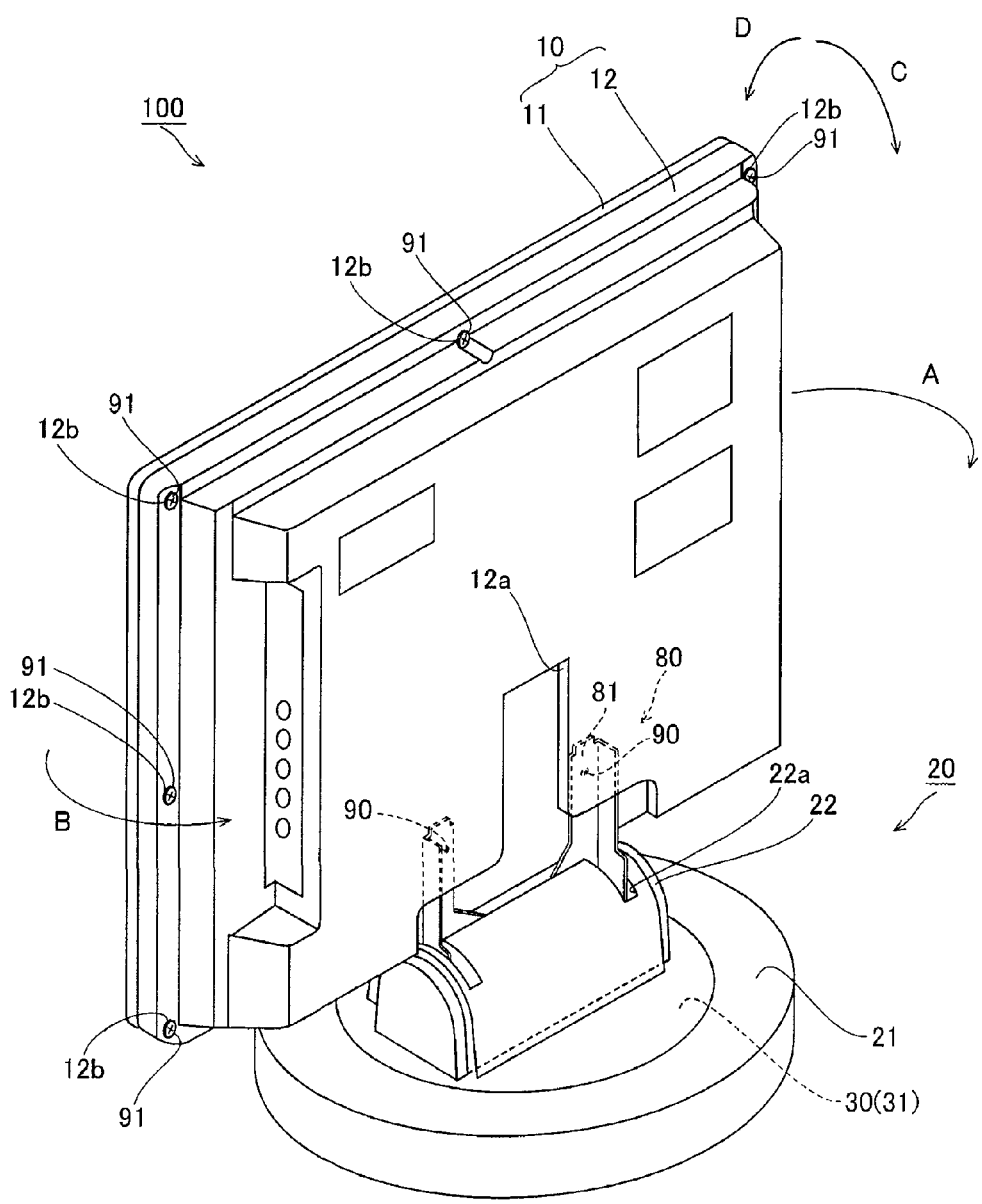
FIG. 1 is a perspective view showing the overall structure of a liquid crystal display provided with a display screen turning apparatus including a torque limiter according to an embodiment of the present invention.

As shown in FIG. 1, a display screen turning apparatus 20 according to the embodiment of the present invention is so provided as to enable a display body 10 of a liquid crystal display 100 supported by a display screen support mechanism 80 to turn in a horizontal direction (along arrow A or B) by a prescribed angle in a horizontal plane and to be inclined in the anteroposterior direction (along arrow C or D) by a prescribed angle with respect to a vertical plane. The display body 10 is an example of the "display screen portion" in the present invention.

Figure 2:
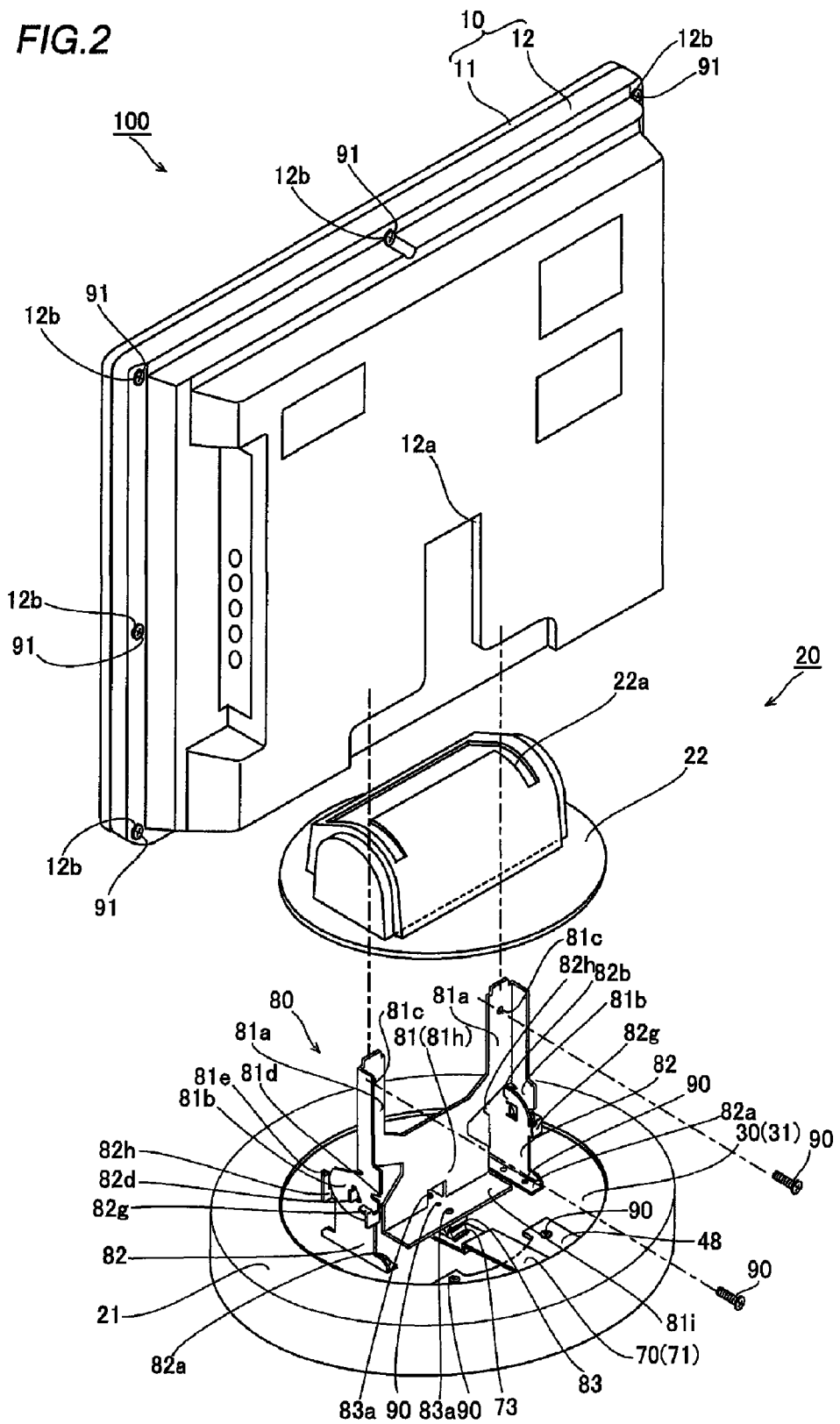
FIG. 2 is an exploded perspective view of the liquid crystal display according to the embodiment of the present invention shown in FIG. 1.
Figure 3:
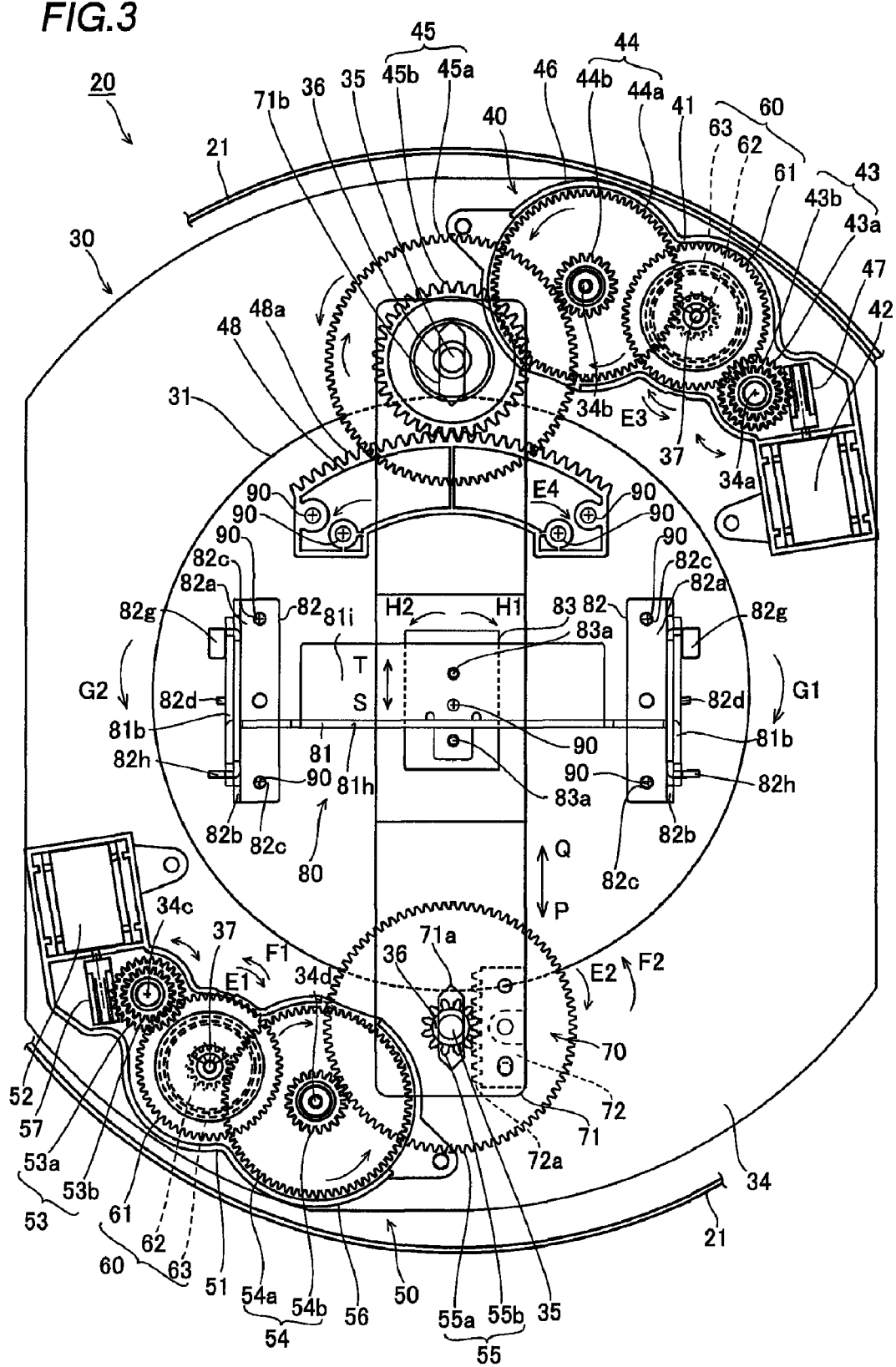
FIG. 3 is a plan view of the display screen turning apparatus provided with the torque limiter according to the embodiment of the present invention shown in FIG. 1.

As shown in FIG. 3, the display screen turning apparatus 20 is constituted of the display screen support mechanism 80 supporting the display body 10 (see FIG. 2), a base portion 30 for turning the display body 10 (see FIG. 2) supported by the display screen support mechanism 80 in the horizontal direction (along arrow A or B in FIG. 1) in the horizontal plane, a horizontal turning/driving portion 40 horizontally turning a turntable 31, described later, arranged on the base portion 30 while controlling the turning angle of the turntable 31 and a vertical turning/driving portion 50 turning the display body 10 supported by the display screen support mechanism 80 in the anteroposterior direction (along arrow C or D in FIG. 1) by the prescribed angle with respect to the vertical plane while controlling the turning angle of the display screen support mechanism 80.

Figure 4:
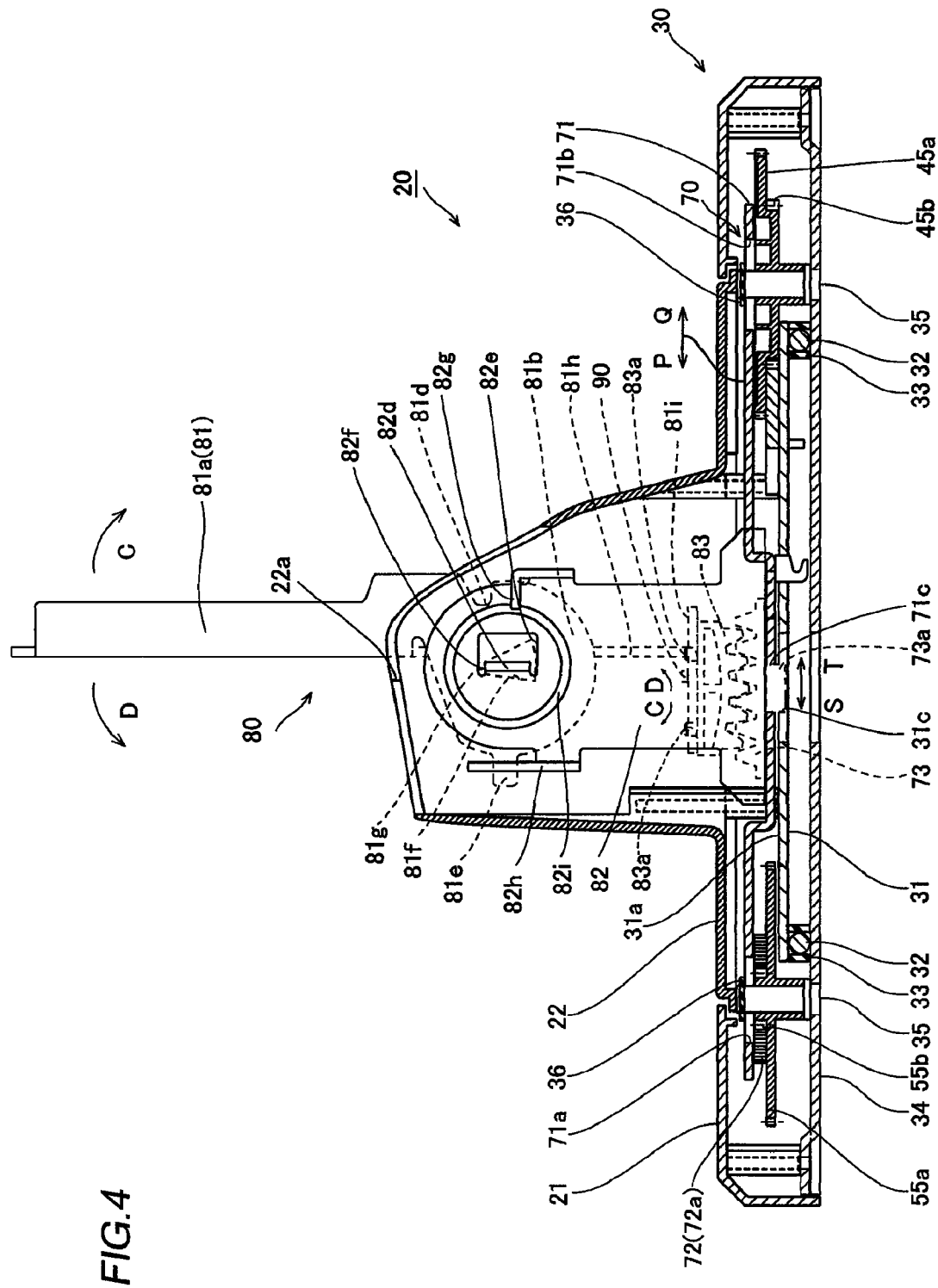
FIG. 4 is a sectional view of the display screen turning apparatus provided with the torque limiter according to the embodiment of the present invention shown in FIG. 1.
Figure 5:
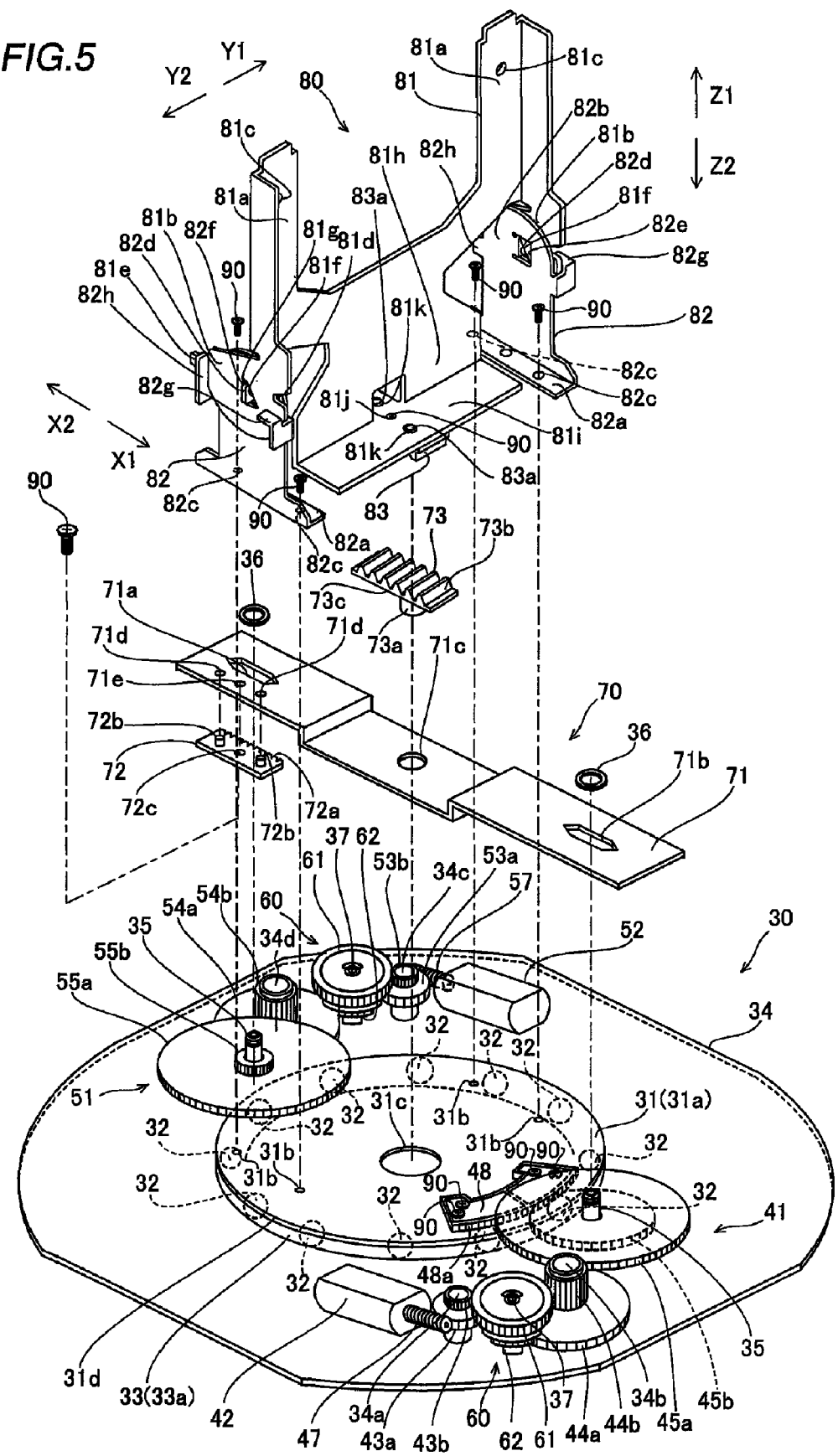
FIG. 5 is an exploded perspective view of the torque limiter according to the embodiment of the present invention shown in FIG. 1.

As shown in FIGS. 4 and 5, the base portion 30 includes the turntable 31 of sheet metal mounted with the display screen support mechanism 80, a guide member 33 of resin having a plurality of steel balls 32 arranged therein at prescribed intervals and rotatably holding the steel balls 32, a base member 34 of sheet metal, a support member (not shown) of metal rotatably supporting the turntable 31 on the base member 34, boss members 35 of resin receiving rotating shafts of gears 45 and 55 described later to be rotatable while receiving a rack plate 70 of the vertical turning/driving portion 50 to be reciprocative in the horizontal plane, and stop ring members 35 of the rack plate 70 received by the boss members 35.

The base member 34 of the base portion 30 is provided with gears 43, 44, 53 and 54 described later and fixed shafts 34a, 34b, 34c, 34d and 37 rotatably pivotally supporting a torque limiter 60, as shown in FIGS. 3 and 5. The fixed shafts 34a, 34b, 34c, 34d and 37 are fixed onto the base member 34 to protrude upward (along arrow Z2) as shown in FIG. 5, and so formed as to have circular sections, as shown in FIG. 3. The fixed shaft 37 is an example of the "fixed shaft portion" in the present invention.

Figure 9:
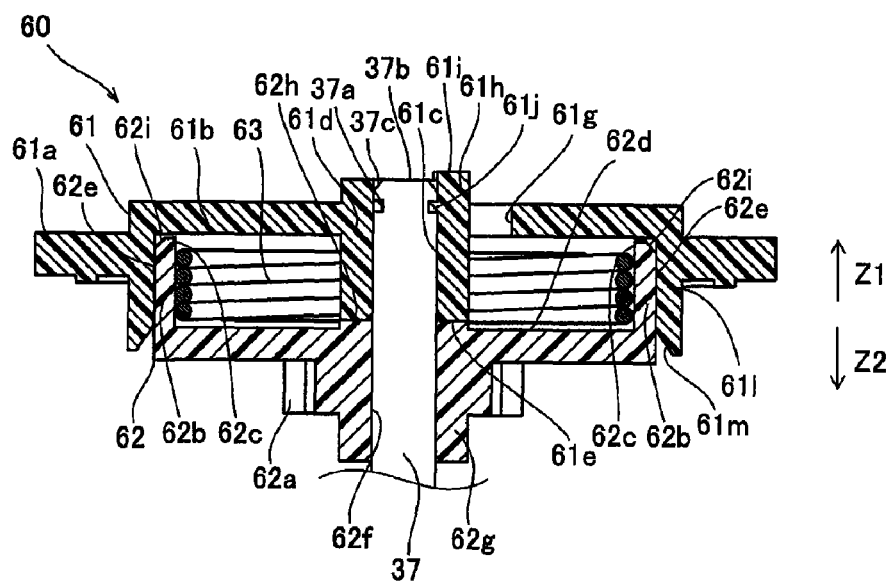
FIG. 9 is a sectional view taken along the line 200-200 in FIG. 8.
Figure 10:
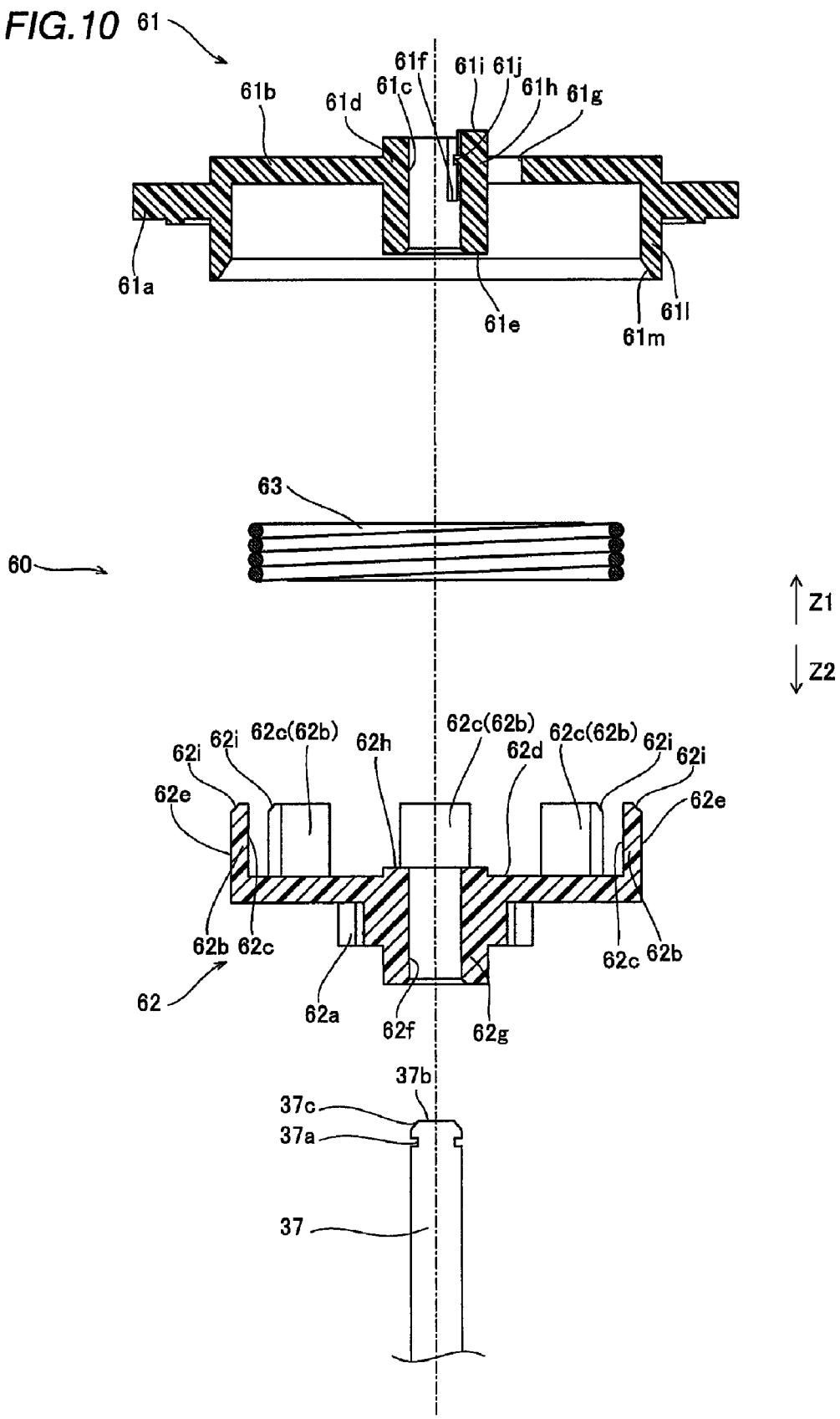
FIG. 10 is an exploded sectional view of the torque limiter according to the embodiment of the present invention shown in FIG. 1.

According to this embodiment, a groove portion 37a is peripherally formed on the fixed shaft 37, as shown in FIGS. 9 and 10. Thus, the groove portion 37a is integrally provided on the fixed shaft 37. The groove portion 37a is so provided as to engage with a protrusion 61j described later. An inclined portion 37c is formed on the outer periphery of an upper end portion 37b of the fixed shaft 37 in an insertion direction (along arrow Z1) for the fixed shaft 37 by chamfering the outer periphery of the upper end portion 37b. The groove portion 37a is formed on the outer peripheral surface of the fixed shaft 37 in the vicinity of the upper end portion 37b. The groove portion 37a is an example of the "first engaging portion" in the present invention, and the upper end portion 37b is an example of the "forward end portion" in the present invention. The inclined portion 37c is an example of the "first chamfer" in the present invention.

As shown in FIGS. 3 and 5, the horizontal turning/driving portion 40 is constituted of a transmission gear portion 41 for rotating the turntable 31 provided on the base portion 30 in the horizontal direction (along arrow A or B in FIG. 1) in the horizontal plane and a stepping motor 42 serving as a driving source for the transmission gear portion 41. The horizontal turning/driving portion 40 is formed to be arranged in the base portion 30, as shown in FIG. 3. The transmission gear portion 41 is so formed that the gear 43 of resin, the torque limiter 60 and the gear 44 of resin are arranged in a gear box 46 of resin while the gear 45 of resin is arranged outside the gear box 46.

Figure 8:
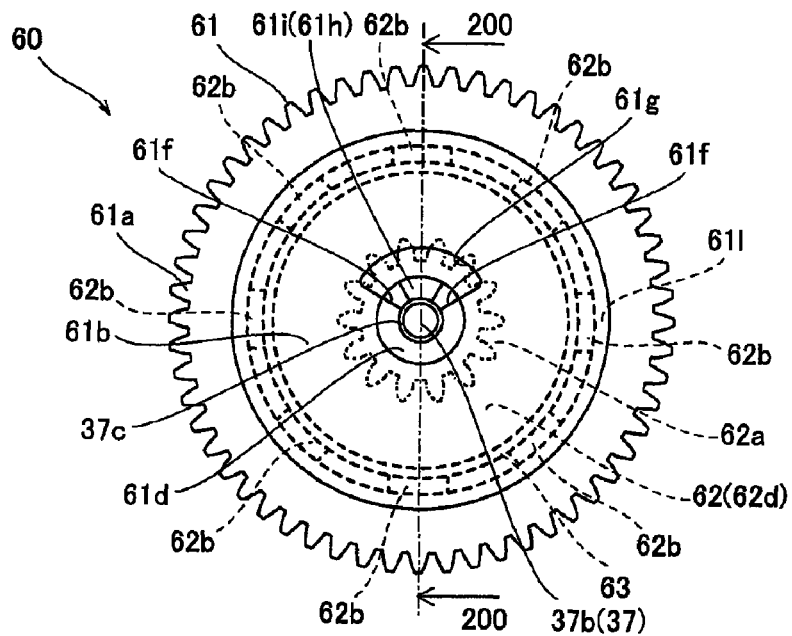
FIG. 8 is a plan view of the torque limiter according to the embodiment of the present invention shown in FIG. 1.

The torque limiter 60 is constituted of a driving gear 61 of resin, a driven gear 62 of resin and a coil spring 63 of metal, as shown in FIGS. 8 to 10. The driving gear 61 and the driven gear 62 are examples of the "second rotating member" and the "first rotating member" in the present invention respectively. The coil spring 63 is an example of the "spring member" in the present invention.

Figure 11:
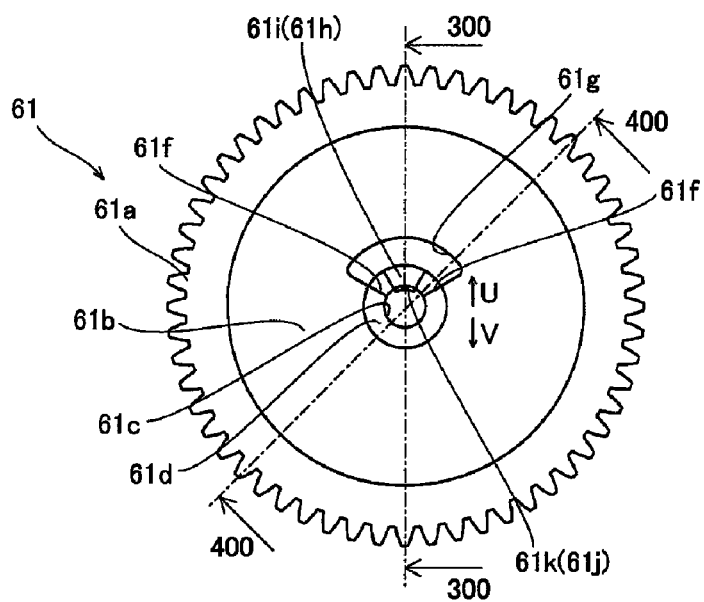
FIG. 11 is a plan view of a driving gear of the torque limiter according to the embodiment of the present invention shown in FIG. 1.

As shown in FIG. 11, a gear portion 61a is peripherally provided on the side surface of the driving gear 61 of resin. A lid portion 61b concentric with the gear portion 61a is formed on the driving gear 61 over the entire upper surface located above (along arrow Z1 in FIG. 12) the position provided with the gear portion 61a. At the center of the driving gear 61, a shaft receiving portion 61c provided with a shaft receiving hole 61c receiving the fixed shaft 37 is formed integrally with the driving gear 61. When the fixed shaft 37 is inserted into the shaft receiving hole 61c, the driving gear 61 is supported to be rotatable with respect to the fixed shaft 37. The gear portion 61a and the shaft receiving portion 61d are examples of the "driving gear portion" and the "second shaft receiving portion" in the present invention respectively.

Figure 12:
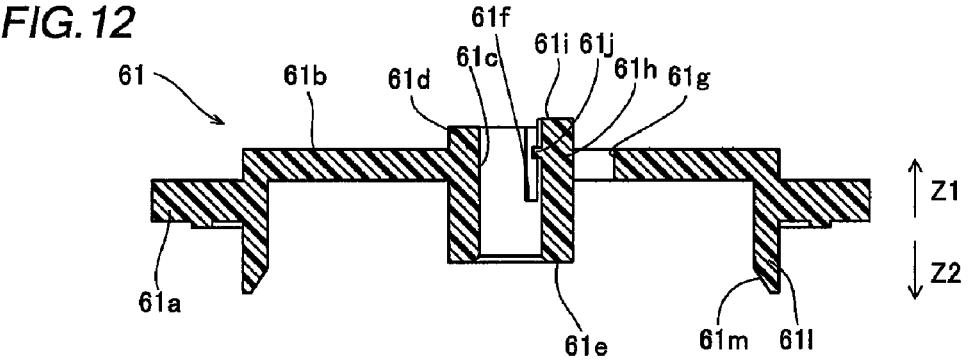
FIG. 12 is a sectional view taken along the line 300-300 in FIG. 11.
Figure 13:
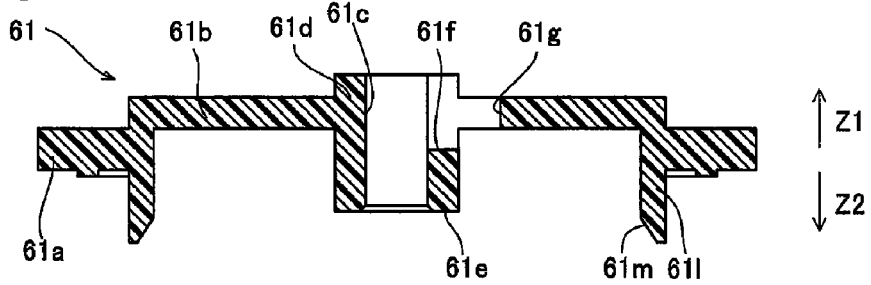
FIG. 13 is a sectional view taken along the line 400-400 in FIG. 11.

As shown in FIG. 11, the shaft receiving portion 61d is provided concentrically with the gear portion 61a. As shown in FIGS. 12 and 13, the shaft receiving portion 61d is so provided as to protrude upward (along arrow Z1) from the lid portion 61b, and to extend downward (along arrow Z2) from the lid portion 61b. As shown in FIG. 9, a lower end portion 61e of the shaft receiving portion 61d is so formed as to come into contact with an upper end portion 62h of a shaft receiving portion 62g, described later, of the driven gear 62.

As shown in FIG. 11, an upper portion of the shaft receiving portion 61d is partially cut on two positions, to form a pair of groove portions 61f. The lid portion 61b is partially cut in a sectorial manner to connect the pair of groove portions 61f with each other, thereby forming a hole 61g. Thus, an engaging support portion 61h partially forming the shaft receiving portion 61d is provided on a position enclosed with the pair of groove portions 61f, the hole 61g and the shaft receiving hole 61c. The engaging support portion 61h is provided concentrically with the shaft receiving portion 61d, so that the side surface of the fixed shaft 37 comes into contact with the shaft receiving portion 61d and the engaging support portion 61h when the fixed shaft 37 is inserted into the shaft receiving hole 61c of the shaft receiving portion 61d. The hole 61g is formed to be positioned on the outer peripheral surface side (along arrow U) of the engaging support portion 61h. The pair of groove portions 61f are examples of the "notches" in the present invention respectively.

According to this embodiment, the engaging support portion 61h, provided integrally with the shaft receiving portion 61d and the driving gear 61 as hereinabove described, is made of elastically deformable resin. Further, the engaging support portion 61h is enclosed with the pair of groove portions 61f, the hole 61g and the shaft receiving hole 61c. Thus, the engaging support portion 61h is formed to be elastically deformable toward the hole 61g (along arrow U) and toward the shaft receiving hole 61c (along arrow V) with reference to a position close to the bottom surfaces of the groove portions 61f of the engaging support portion 61h, as shown in FIG. 11.

An upper end portion 61i of the engaging support portion 61h protrudes slightly upward (along arrow Z1) beyond the upper end portion of the shaft receiving portion 61d as shown in FIG. 12, and protrudes slightly upward (along arrow Z1) beyond the upper end portion 37b of the fixed shaft 37 when the fixed shaft 37 is inserted into the shaft receiving hole 61c, as shown in FIG. 9.

Figure 14:
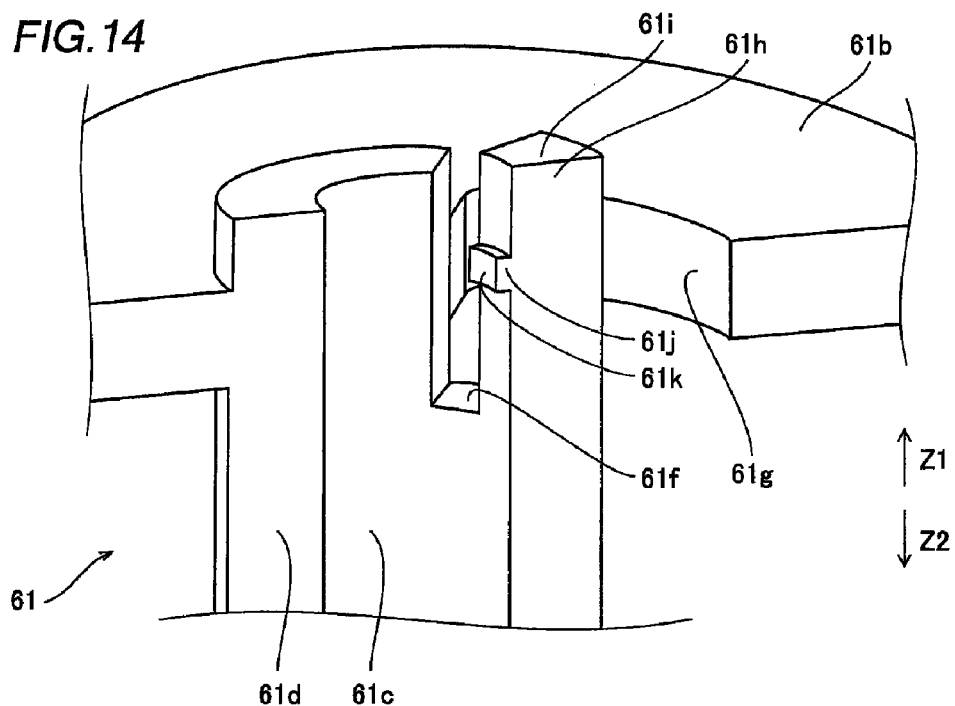
FIG. 14 is an enlarged view around a protrusion of the driving gear of the torque limiter according to the embodiment of the present invention shown in FIG. 1.
Figure 15:
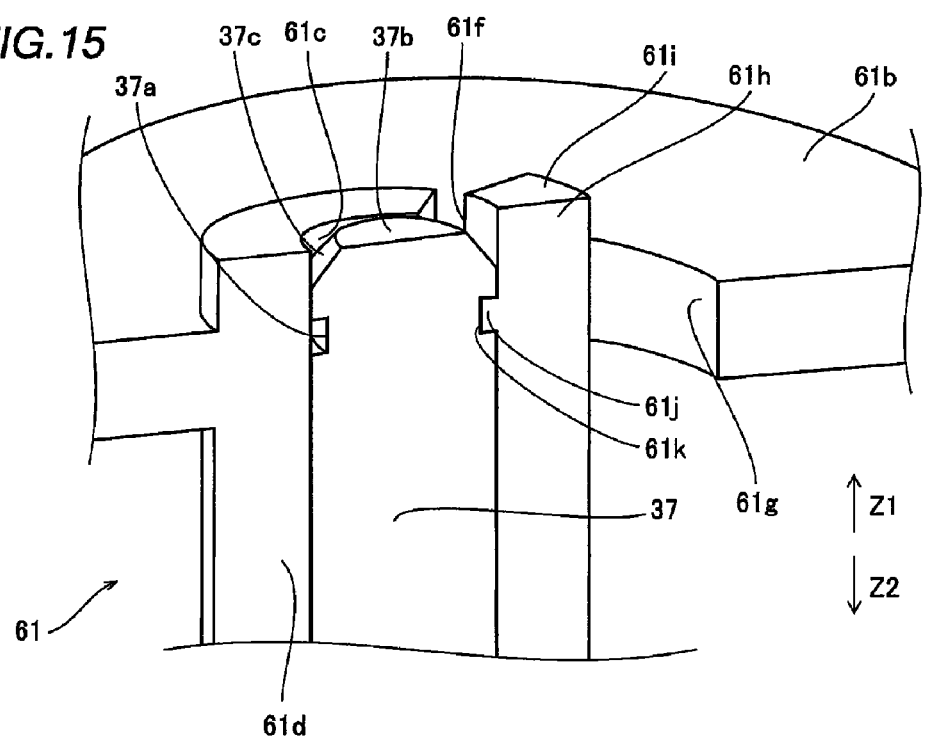
FIG. 15 is an enlarged view around the protrusion of the driving gear of the torque limiter according to the embodiment of the present invention shown in FIG. 1 in a state receiving a fixed shaft.

According to this embodiment, the protrusion 61j is integrally formed in the vicinity of the upper end portion 61i of the engaging support portion 61h in the insertion direction (along arrow Z1) for the fixed shaft 37 to protrude toward the axial center of the shaft receiving hole 61c receiving the fixed shaft 37, as shown in FIG. 14. The protrusion 61j is an example of the "second engaging portion" in the present invention. The protrusion 61j is so formed as to engage with the groove portion 37a of the fixed shaft 37, and formed to be movable in the groove portion 37a following rotation of the driving gear 61 in the state engaging with the groove portion 37a provided on the outer peripheral surface of the fixed shaft 37 when the driving gear 61 rotates with respect to the fixed shaft 37, as shown in FIG. 15. The driving gear 61 is so formed that movement in the extensional direction of the fixed shaft 37 (along arrow Z1 or Z2) is regulated when the groove portion 37a of the fixed shaft 37 and the protrusion 61j engage with each other. Thus, when the driving gear 61 is fitted from above (along arrow Z1) with the driven gear 62 having the coil spring 63 press-fitted there into, the driving gear 61 is pressed from below (along arrow Z2) thereby inhibiting the coil spring 63 from upward displacement, as sow in FIG. 9. A surface 61k of the protrusion 61j opposed to the bottom surface of the peripheral groove portion 37a of the fixed shaft 37 is arcuately formed to correspond to the bottom surface of the peripheral groove portion 37a of the fixed shaft 37.

As shown in FIGS. 12 and 13, an engaging portion 61l is formed concentrically with the gear portion 61a, to extend downward (along arrow Z2) from the side surface of the lid portion 61b. The engaging portion 61l is so formed that a plurality of fragment portions 62b, described later, of the driven gear 62 having the coil spring 63 press-fitted there into are inserted into the inner peripheral surface side thereof to come into pressure contact with the engaging portion 61l. An inclined portion 61m is formed on the inner peripheral surface side of the lower end portion of the engaging portion 61l by chamfering the lower end portion of the engaging portion 61l along the inner peripheral surface. The inclined portion 61m is an example of the "second chamfer" in the present invention.

Figure 16:
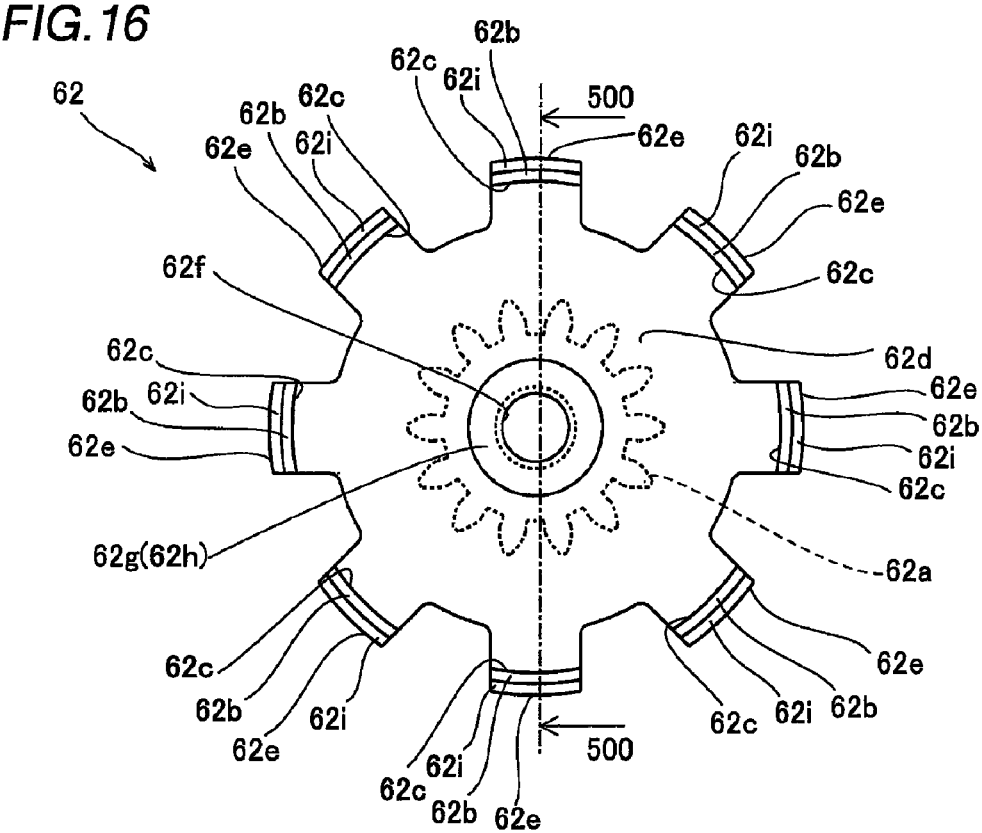
FIG. 16 is a plan view of a driven gear of the torque limiter according to the embodiment of the present invention shown in FIG. 1.
Figure 17:
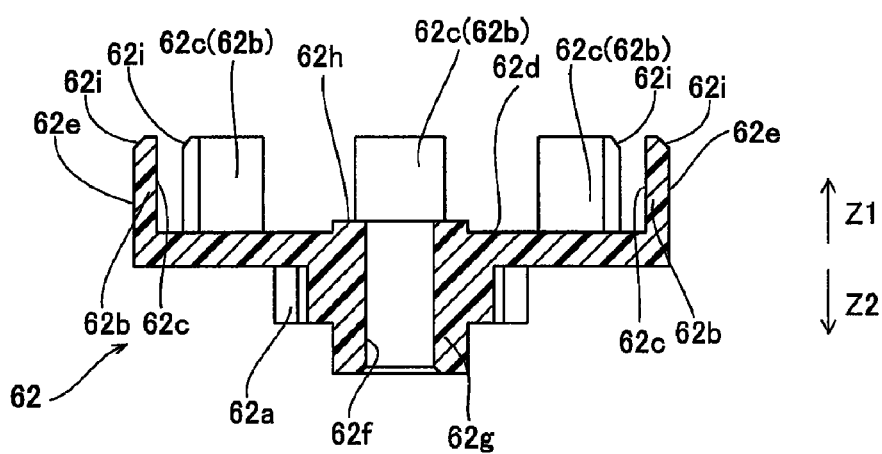
FIG. 17 is a sectional view taken along the line 500-500 in FIG. 16.
Figure 18:
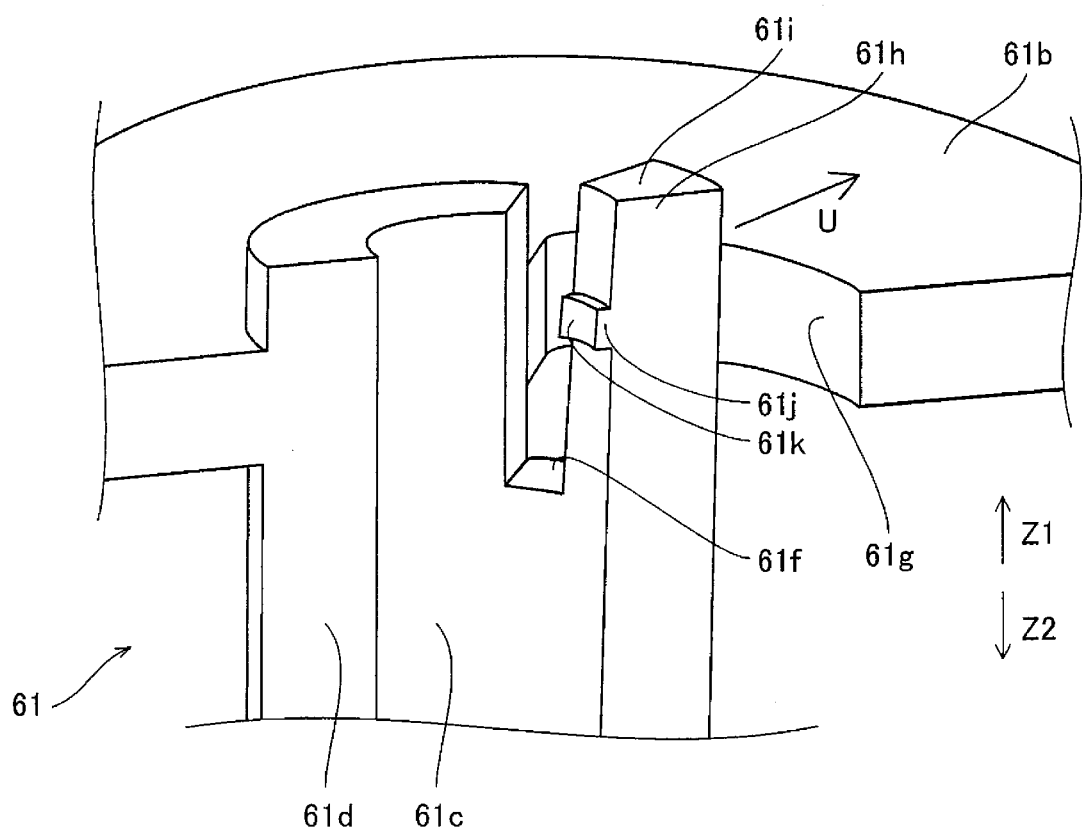
FIG. 18 is an enlarged view for illustrating assembling of the torque limiter and the fixed shaft according to the embodiment of the present invention shown in FIG. 1.

As shown in FIGS. 16 and 17, a gear portion 62a is peripherally provided on the side surface of the driven gear 62 of resin. In the driven gear 62, the plurality of fragment portions 62b concentric with the gear portion 62a are integrally formed on the upper surface located above (along arrow Z1 in FIG. 17) the position provided with the gear portion 62a. Eight such fragment portions 62b are provided to extend upward concentrically at equiangular intervals of 45°. The gear portion 62a is an example of the "driven gear portion" in the present invention.

According to this embodiment, a spring receiving portion 62d into which the coil spring 63 is press-fitted from above (along arrow Z1) is formed on the sides of inner peripheral surfaces 62c of the plurality of fragment portions 62b, as shown in FIG. 16. The coil spring 63 is so inserted into the spring storage portion 62d as to press the plurality of fragment portions 62b toward the sides of outer peripheral surfaces 62e thereof. Thus, pressure contact force is applied to the engaging portion 61l of the driving gear 61 fitted with the sides of the outer peripheral surfaces 62e of the plurality of fragment portions 62b from above (along arrow Z1), as shown in FIG. 9. The plurality of fragment portions 62b are formed separately from each other, to be deformable toward the sides of the outer peripheral surfaces 62e respectively. Thus, the coil spring 63 can be easily press-fitted into the spring storage portion 62d by deforming the fragment portions 62b toward the sides of the outer peripheral surfaces 62e respectively. When the driving gear 61 is fitted with the driven gear 62, the lid portion 61b of the driving gear 61 covers the spring storage portion 62d from above (along arrow Z1), as shown in FIG. 9.

As shown in FIGS. 16 and 17, the shaft receiving portion 62g provided with a shaft receiving hole 62f receiving the fixed shaft 37 is formed at the center of the driven gear 62 of resin, integrally with the driven gear 62. The shaft receiving hole 62g is an example of the "first shaft receiving portion" in the present invention. When the fixed shaft 37 is inserted into the shaft receiving hole 62f, the driven gear 62 is supported to be rotatable with respect to the fixed shaft 37.

As shown in FIG. 17, the upper end portion 62h of the shaft receiving portion 62g slightly protrudes upward (along arrow Z1) beyond the spring storage portion 62d, and most part of the shaft receiving portion 62g is so provided as to extend downward (along arrow Z2) from the spring storage portion 62d. As shown in FIG. 9, the upper end portion 62h of the shaft receiving portion 62g is so formed as to come into contact with the lower end portion 61e of the shaft receiving portion 61d of the driving gear 61.

Inclined portions 62i are formed on the sides of the outer peripheral surfaces 62e of the upper end portions of the plurality of fragment portions 62b by chamfering the upper end portions of the plurality of fragment portions 62b along the outer peripheral surfaces 62e. The inclined portions 62i are examples of the "third chamfers" in the present invention.

According to this embodiment, the driving gear 61 of the torque limiter 60 is brought into pressure contact with the driven gear 62 by the coil spring 63 with previously set urging force. When driving torque exceeding frictional force between the engaging portion 61l of the driving gear 61 and the outer peripheral surfaces 62e of the fragment portions 62b of the driven gear 62 following the pressure contact force of the coil spring 63 is generated with respect to the driving gear 61, therefore, the engaging portion 61l of the driving gear 61 and the outer peripheral surfaces 62e of the fragment portions 62b of the driven gear 62 so slip that the driving torque of the driving gear 61 is not entirely transmitted to the driven gear 62. When driving torque below the frictional force between the engaging portion 61l of the driving gear 61 and the outer peripheral surfaces 62e of the fragment portions 62b of the driven gear 62 following the pressure contact force of the coil spring 63 is generated with respect to the driving gear 61, on the other hand, the engaging portion 61l of the driving gear 61 does not slip with respect to the outer peripheral surfaces 62e of the fragment portions 62b of the driven gear 62 but transmits the rotational frequency of the driving gear 61 to the driven gear 62.

Figure 6:
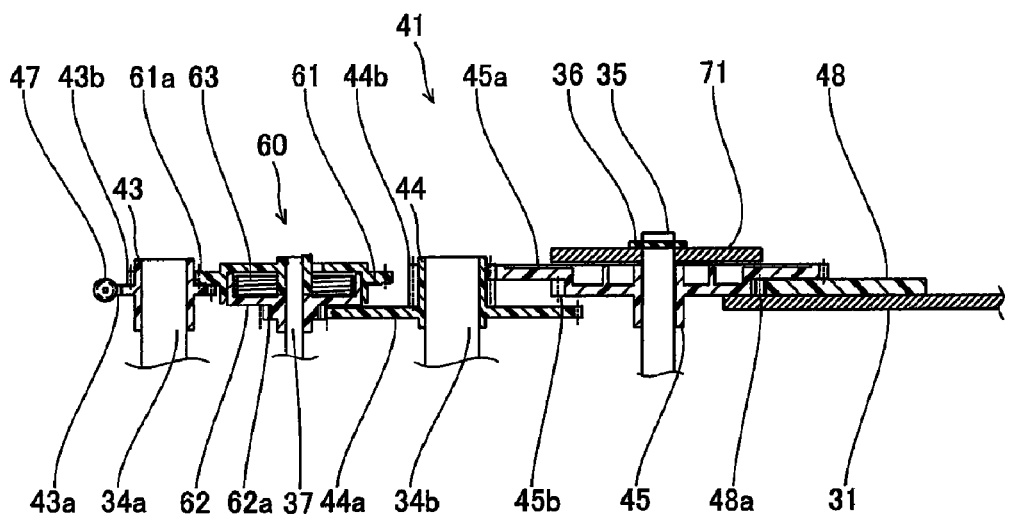
FIG. 6 is a sectional view around a horizontal turning/driving portion provided with the torque limiter according to the embodiment of the present invention shown in FIG. 1.

As shown in FIG. 3, a worm gear 47 of resin is press-fitted into the rotating shaft of the stepping motor 42 of the horizontal turning/driving portion 40. As shown in FIG. 6, the gear 43 integrally includes a large-diametral gear portion 43a and a small-diametral gear portion 43b. The gear 44 also integrally includes a large-diametral gear portion 44a and a small-diametral gear portion 44b. Further, the gear 45 also integrally includes a large-diametral gear portion 45a and a small-diametral gear portion 45b. A turning gear member 48 of resin is fixed to an upper surface 31a of the turntable 31 of the base portion 30 with four screws 90.

As shown in FIG. 6, the worm gear 47 meshes with the large-diametral gear portion 43a of the gear 43 so that the rotating shaft thereof is orthogonal thereto, while the small-diametral gear portion 43b of the gear 43 meshes with the gear portion 61a of the driving gear 61 of the torque limiter 60. The gear portion 62a of the driven gear 62 of the torque limiter 60 meshes with the large-diametral gear portion 44a of the gear 44, while the small-diametral gear portion 44b of the gear 44 meshes with the large-diametral gear portion 45a of the gear 45. The small-diametral gear portion 45b of the gear 45 meshes with the turning gear portion 48a of the turning gear member 48. Therefore, driving force of the stepping motor 42 is transmitted to the turntable 31 through the worm gear 47, the gear 43, the torque limiter 60, the gears 44 and 45 and the turning gear member 48.

As shown in FIGS. 3 and 5, the vertical turning/driving portion 50 is constituted of a transmission gear portion 51 consisting of a plurality of gear members, a stepping motor 52 serving as a driving source for the transmission gear portion 51 and the rack plate 70 for rotating a display screen support member 81 rotatably provided on the display screen support mechanism 80 mounted on the turntable 31 of the base portion 30 in the anteroposterior direction (along arrow C or D in FIG. 1) with respect to the vertical plane.

Figure 7:
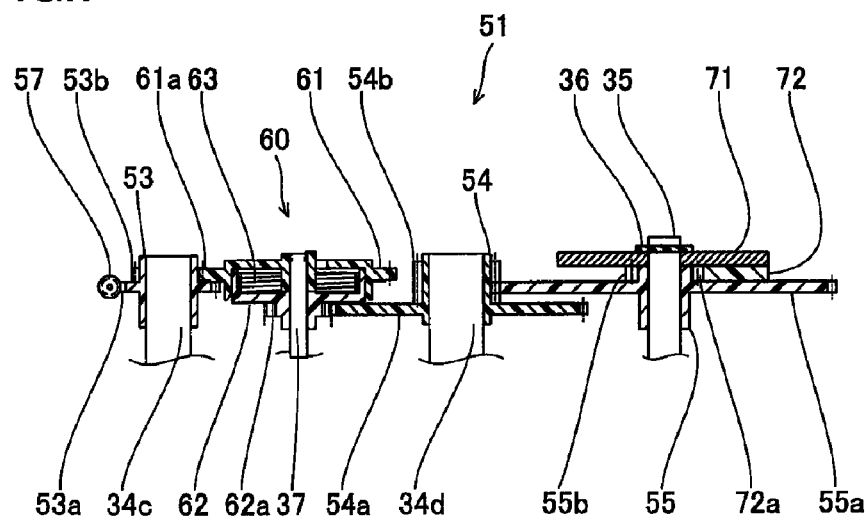
FIG. 7 is a sectional view around a vertical turning/driving portion provided with the torque limiter according to the embodiment of the present invention shown in FIG. 1.

As shown in FIG. 3, the transmission gear portion 51 is so formed that the gear 53 of resin, the torque limiter 60 and the gear 54 of resin are arranged in a gear box 56 of resin while the gear 55 of resin is arranged outside the gear box 56. As shown in FIG. 7, the gear 53 of resin integrally includes a large-diametral gear portion 53a and a small-diametral gear portion 53b. The gear 54 of resin also integrally includes a large-diametral gear portion 54a and a small-diametral gear portion 54b. Further, the gear 55 of resin also integrally includes a large-diametral gear portion 55a and a small-diametral gear portion 55b.

As shown in FIG. 7, a worm gear 57 of resin is press-fitted into the rotating shaft of the stepping motor 52. The worm gear 57 meshes with the large-diametral gear portion 53a of the gear 53 so that the rotating shaft is orthogonal thereto. The small-diametral gear portion 53b of the gear 53 meshes with the gear portion 61a of the driving gear 61 of the torque limiter 60. The gear portion 62a of the driven gear 62 of the torque limiter 60 meshes with the large-diametral gear portion 54a of the gear 54, while the small-diametral gear portion 54b of the gear 54 meshes with the large-diametral gear portion 55a of the gear 55. The small-diametral gear portion 55b of the gear 55 horizontally meshes with a gear portion 72a of a rack gear 72 described later. Therefore, driving force of the stepping motor 52 is transmitted to the rack plate 70 through the worm gear 57, the gear 53, the torque limiter 60, the gears 54 and 55 and the rack gear 72.

The rack plate 70 is constituted of a plate member 71 of sheet metal, the rack gear 72 of resin and another rack gear 73 of resin, as shown in FIG. 5. The rack gear 72 is mounted on the lower surface of the plate member 71 with a screw 90. The rack gear 72 is so formed as to horizontally mesh with the small-diametral gear portion 55 of the gear 55, as shown in FIG. 3.

As shown in FIG. 5, slots 71a and 71b extending along the longitudinal direction of the plate member 71 are formed in the vicinity of both longitudinal end portions of the plate member 71 respectively, while a circular receiving hole 71c receiving a protrusion 73a of the rack gear 73 is formed on a substantially central portion of the plate member 71. The plate member 71 further has two positioning holes 71d and a screw mounting hole 71e.

As shown in FIG. 5, the rack gear 72 is provided with the gear portion 72a along the longitudinal side surface along arrow Y1, and also provided with two bosses 72b and a screw receiving hole 72c. Therefore, the rack gear 72 can be mounted on the plate member 71 from below (along arrow Z2) by fitting the bosses 72b of the rack gear 72 into the positioning holes 71d of the plate member 71 and tightening the screw 90 into the screw mounting hole 71e of the plate member 71 through the screw receiving hole 72c of the rack gear 72.

A tooth flank 73b having a plurality of tooth tips is formed on a surface of the rack gear 73 along arrow Z1 arranged on the plate member 71 in the form of a planar surface, as shown in FIG. 5. The ring-shaped protrusion 73a insert able into the receiving hole 71c of the plate member 71 is formed on a substantially central portion of a rear surface 73c of the rack gear 73 along arrow Z2. Thus, when the protrusion 73a is inserted into the receiving hole 71c of the plate member 71, the tooth flank 73b is horizontalized (planarized), and rotatable along arrow H1 or H2 (see FIG. 3) with respect to the plate member 71.

When the pair of boss members 35 are inserted into the rack plate 70 through the slots 71a and 71b of the plate member 71 respectively, the rack plate 70 is linearly reciprocative along arrows P and Q, as shown in FIGS. 3 and 4. Therefore, normal or reverse rotation of the stepping motor 52 is so transmitted to the rack gear 72 through the transmission gear portion 51 that the rack plate 70 is linearly reciprocative on the turntable 31 along arrows P and Q.

The display screen support mechanism 80 is constituted of the display screen support member 81 made of sheet metal, a pair of vertical support members 82 of sheet metal and a rotating gear 83 of resin so arranged as to mesh with the rack gear 73 of the rack plate 70, as shown in FIG. 5. The display screen support member 81 is mounted on the pair of vertical support members 82 to be rotatable with torque exceeding a prescribed level.

The display screen support member 81 includes a pair of display body mounting portions 81a so provided as to extend upward (along arrow Z1) and a pair of rotating portions 81b provided on side surfaces of the display screen support member 81 along arrows Y1 and Y2 respectively, as shown in FIG. 5. Screw receiving holes 81c are formed in the pair of display body mounting portions 81a respectively.

The pair of rotating portions 81b of the display screen support member 81 are provided to extend from both end portions of the display body mounting portions 81a in the vertical direction (along arrows X1 and X2) with respect to the display body mounting portions 81a respectively. Notches 81d concaved along arrow X2 are formed on the rotating portions 81b along arrow X1, while protrusions 81e convexed along arrow X2 are formed on the rotating portions 81b along arrow X2.

As shown in FIGS. 4 and 5, sectorial holes 81f are formed on the rotating portions 81b. The holes 81f are so provided as to receive support shafts 82d described later. The sectorial holes 81f are so arranged that base portions 81g on the sides of circle centers are positioned upward, while the base portions 81g on the sides of the circle centers come into contact with upper surfaces 82f, described later, of the support shafts 82d. Thus, the base portions 81g of the sectorial holes 81f are so formed as to receive the vertical load of the display body 10 (see FIG. 2) through the display screen support member 81. The display screen support member 81 is formed to be rotatable in a sectorial angular range with respect to the support shafts 82d around the base portions 81g of the sectorial holes 81f supported by the support shafts 82d in the form of flat plates.

As shown in FIG. 5, a body portion 81h so provided as to extend downward (along arrow Z2) from the display body mounting portions 81a is integrally formed on the display screen support member 81. A lower surface portion 81i so provided as to extend in the vertical direction (along arrows X1 and X2) with respect to the body portion 81h is integrally formed on the lower end of the body portion 81h. A screw receiving hole 81j receiving a screw 90 for fixing the rotating gear 83 and the display screen support member 81 to each other is formed at the center of the lower surface portion 81i. A pair of boss receiving holes 81k are formed to hold the screw receiving hole 81j therebetween. A pair of bosses 83a, described later, of the rotating gear 83 are inserted into the pair of boss receiving holes 81k respectively.

The pair of vertical support members 82 are so arranged that the support shafts 82d described later are inserted into the holes 81f of the display screen support member 81 outward from the inner side of the display screen support member 81 respectively, as shown in FIG. 5. More specifically, the vertical support member 82 mounted on the rotating portion 81b of the display screen support member 81 provided along arrow Y1 is arranged to be in contact with a surface, provided along arrow Y2, of the rotating portion 81b provided along arrow Y1. On the other hand, the vertical support member 82 mounted on the rotating portion 81b of the display screen support member 81 provided along arrow Y2 is arranged to be in contact with a surface, provided along arrow Y1, of the rotating portion 81b provided along arrow Y2.

The vertical support members 82 include turntable mounting portions 82a and rotating portion mounting portions 82b, as shown in FIG. 5. Screw mounting holes 82c for fixing the turntable mounting portions 82a to the turntable 31 are formed on the turntable mounting portions 82a. The rotating portion mounting portions 82b of the vertical support members 82 are so provided as to extend upward (along arrow Z1) in the vertical direction with respect to the turntable mounting portions 82a from end portions of the turntable mounting portions 82a.

As shown in FIG. 4, the support shafts 82d are formed on substantially central portions of the vertical support members 82 along arrows X1 and X2. The support shafts 82d are in the form of flat plates elongated in the vertical direction (along arrows Z1 and Z2). The support shafts 82d are formed integrally with the vertical support members 82 by partially uprighting the vertical support members 82 made of sheet metal. Holes 82e are formed in the uprighted portions of the vertical support members 82.

The support shafts 82d are provided to be inserted into the sectorial holes 81f of the rotating portions 81b, as shown in FIGS. 4 and 5. More specifically, the support shafts 82d are so formed that the upper surfaces 82f thereof are in contact with the base portions 81g of the sectorial holes 81f, as shown in FIG. 4. Thus, the support shafts 82d are so formed as to receive the vertical load of the display body 10 (see FIG. 2) on the upper surfaces 82f through the base portions 81g of the sectorial holes 81f and the display screen support member 81. Further, the display screen support member 81 is formed to be rotatable in the angular range of the sectorial holes 81f with respect to the support shafts 82d around the base portions 81g of the sectorial holes 81f supported by the support shafts 82d in the form of flat plates. In other words, the support shafts 82d function as the rotating shafts of the display screen support member 81. Thus, the display screen support member 81 renders the display body 10 rotatable in the anteroposterior direction (along arrow C or D) with respect to the vertical plane of the display screen turning apparatus 20.

As shown in FIG. 4, hooks 82g are formed on first side surfaces of the rotating portion mounting portions 82b integrally with the vertical support members 82, while hooks 82h are formed on second side surfaces integrally with the vertical support members 82. The hooks 82g and 82h are formed by partially uprighting the vertical support members 82 made of sheet metal. The hooks 82g and 82h are so formed as to inhibit the support shafts 82d from slipping out of the holes 81f, thereby inhibiting the vertical support members 82 from slipping out of the display screen support member 81.

When rotating in excess of the rotational range of the display screen support member 81 in the anteroposterior direction (along arrow C or D in FIG. 1) with respect to the vertical plane in use of the display screen turning apparatus 20, the hooks 82g of the vertical support members 82 are separable from the notches 81d of the rotating portions 81b of the display screen support member 81, while the hooks 82h of the vertical support members 82 are movable in separating directions without being hindered by the protrusions 81e of the rotating portions 81b. Thus, when rotating in excess of the rotational range of the display screen support member 81 with respect to the vertical plane in use of the display screen turning apparatus 20, the vertical support members 82 are released from states stopped to the display screen support member 81.

As shown in FIG. 4, ring-shaped protrusions 82i are formed on the rotating portion mounting portions 82b around substantially central portions of the support shafts 82d. The protrusions 82i are formed to be in contact with the rotating portions 81b of the display screen support member 81 when the support shafts 82d of the rotating portion mounting portions 82b are inserted into the holes 81f of the display screen support member 81.

The rotating gear 83 is so arranged as to mesh with the rack gear 73 of the rack plate 70 from above, and arranged on a substantially central portion of the lower surface portion 81i of the display screen support member 81, as shown in FIG. 5. Further, the rack gear 73 and the rotating gear 83 are positioned on the horizontal rotation centers (along arrows G1 and G2 in FIG. 3) of the turntable 31 and the display screen support member 81. The pair of bosses 83a inserted into the pair of boss receiving holes 81k of the display screen support member 81 are formed on the upper surface of the rotating gear 83. A threaded hole (not shown) meshing with the screw 90 is formed at the center between the pair of bosses 83a. The threaded hole is so formed as to correspond to the screw receiving hole 81j of the display screen support member 81.

As shown in FIG. 4, a tooth flank is formed on the lower surface of the rotating gear 83 to have an arcuate shape. Thus, the rotating gear 83 is slidable with respect to the rack gear 73 in a direction perpendicular to a meshing direction (along arrows S and T in FIG. 3) of the rack gear 73 and the rotating gear 83 in the horizontal plane. The upper surface of the rotating gear 83 is fixed to the lower surface portion 81i of the display screen support member 81 with the screw 90. Thus, the rotating gear 83 is fixed to the display screen support member 81, so that the rotation of the display screen support member 81 in the horizontal plane is transmitted to the rack gear 73 meshing with the rotating gear 83 through the rotating gear 83.

As shown in FIG. 5, the turntable 31 of the base portion 30 includes four screw receiving holes 31b provided on the upper surface 31a and a hole 31c provided at the center of the upper surface 31a (in the vicinity of the rotation center of the turntable 31). As shown in FIG. 3, the turntable 31 is arranged on a substantially central portion of the base member 34, to be rotatable in the horizontal plane. As shown in FIG. 5, a plurality of support members (not shown) provided on the base member 34 to circularly enclose the turntable 31 come into surface contact with outer peripheral surfaces 31d and 33a of the turntable 31 and the guide member 33, thereby holding the turntable 31 to be rotatable in the horizontal plane.

As shown in FIGS. 1 and 2, the display body 10 is constituted of a front cabinet 11 of resin and a rear cabinet 12 of resin. The display body 10 is mounted on the display screen support member 81 by tightening screws 90 into screw receiving holes (not shown) of the rear cabinet 12 through the screw receiving holes 81c (see FIG. 5) of the display screen support member 81. A notch 12a for concealedly arranging the display screen support member 81 is integrally provided on the rear cabinet 12. A plurality of screw receiving holes 12b are provided on the outer peripheral portion of the rear cabinet 12, so that the rear cabinet 12 is mounted on the front cabinet 11 with screws 91.

In the display screen turning apparatus 20, a cover member 21 of resin is mounted on the base member 34 with a screw (not shown) inserted from the side of the lower surface of the base member 34 of the base portion 30, as shown in FIG. 4. Further, another cover member 22 of resin is mounted on the upper surface 31a of the turntable 31 with a screw (not shown) to cover the base portion 30 from above and to be turnable in the horizontal direction (along arrow A or B in FIG. 1) integrally with the turntable 31 of the base portion 30, as shown in FIGS. 1 and 4. The cover member 22 of resin is provided with a notch 22a for arranging the display screen support member 81 to be rotatable in the anteroposterior direction (along arrow C or D in FIG. 1), as shown in FIGS. 2 and 4.

Assembling of the torque limiter 60 according to the embodiment of the present invention and combination of the torque limiter 60 and the fixed shaft 37 are now described with reference to FIGS. 9, 10, 15 and 18.

As shown in FIG. 10, the coil spring 63 is press-fitted into the spring receiving portion 62*d* of the driven gear 62 from above (along arrow Z1). Then, the engaging portion 61*l* of the driving gear 61 is fitted with the outer peripheral surfaces 62*e* of the plurality of fragment portions 62*b* of the driven gear 62 combined with the coil spring 63 from above. Thus, the plurality of fragment portions 62*b* and the engaging portion 61*l* are brought into pressure contact with each other, to assemble the torque limiter 60.

As shown in FIG. 10, the torque limiter 60 is set on the fixed shaft 37 from above (along arrow Z1). More specifically, the fixed shaft 37 passes through the shaft receiving hole 62*f* of the shaft receiving portion 62*g* of the driven gear 62 provided on the lower portion of the torque limiter 60, and is inserted into the shaft receiving hole 61*c* of the shaft receiving portion 61*d* of the driving gear 61 provided on the upper portion of the torque limiter 60.

According to this embodiment, the protrusion 61*j* of the driving gear 61 is so provided as to protrude toward the axial center of the shaft receiving hole 61*c*, whereby the upper end portion 37*b* of the fixed shaft 37 inserted into the shaft receiving hole 61*c* comes into contact with the protrusion 61*j*. At this time, force is applied to the upper end portion 61*i* of the engaging support portion 61*h* toward the hole 61*g* (along arrow U), thereby elastically deforming the engaging support portion 61*h* toward the hole 61*g*. Consequently, the fixed shaft 37 is inserted into the shaft receiving hole 61*c* over the protrusion 61*j*.

When the fixed shaft 37 is inserted up to a position where the groove portion 37*a* thereof corresponds to the protrusion 61*j* of the driving gear portion 61, the force applied to the upper end portion 61*i* of the engaging support portion 61*h* is canceled. Thus, the groove portion 37*a* of the fixed shaft 37 and the protrusion 61*j* of the driving gear portion 61 engage with each other as shown in FIG. 15, so that the torque limiter 60 and the fixed shaft 37 are combined with each other as shown in FIG. 9.

Anteroposterior and horizontal turning operations of the display screen turning apparatus 20 according to the embodiment of the present invention are now described with reference to FIGS. 1, 3 to 5 and 19 to 21.

When the display screen turning apparatus 20 rotates the display screen support mechanism 80 in the anteroposterior direction (along arrow C or D) with respect to the vertical plane as shown in FIG. 4, the display body 10 shown in FIG. 1 is rotated upward or downward, and hence the anteroposterior direction is hereinafter referred to as an upward direction or a downward direction.

First, upward and downward turning operations (along arrows C and D in FIG. 1) of the display screen turning apparatus 20 are described.

First, the user presses an upward tilt button (not shown) of an attached remote control (not shown), thereby transmitting a signal for turning the display body 10 (see FIG. 1) in the upward direction (along arrow C in FIG. 1) to a control circuit portion (not shown) of the display body 10. The stepping motor 52 of the display screen turning apparatus 20 is driven on the basis of this signal. More specifically, the stepping motor 52 is driven to rotate the worm gear 57 mounted thereon and to rotate the driving gear 61 of the torque limiter 60 along arrow E1 through the gear 53, as shown in FIG. 3. The driven gear 62 of the torque limiter 60 is also rotated along arrow E1, and the gear 55 is rotated along arrow E2 through the gear 54. Following this rotation of the gear 55 along arrow E2, the plate member 71 of the rack plate 70 moves along arrow P with the rack gear 72 horizontally meshing with the gear 55.

Figure 19:
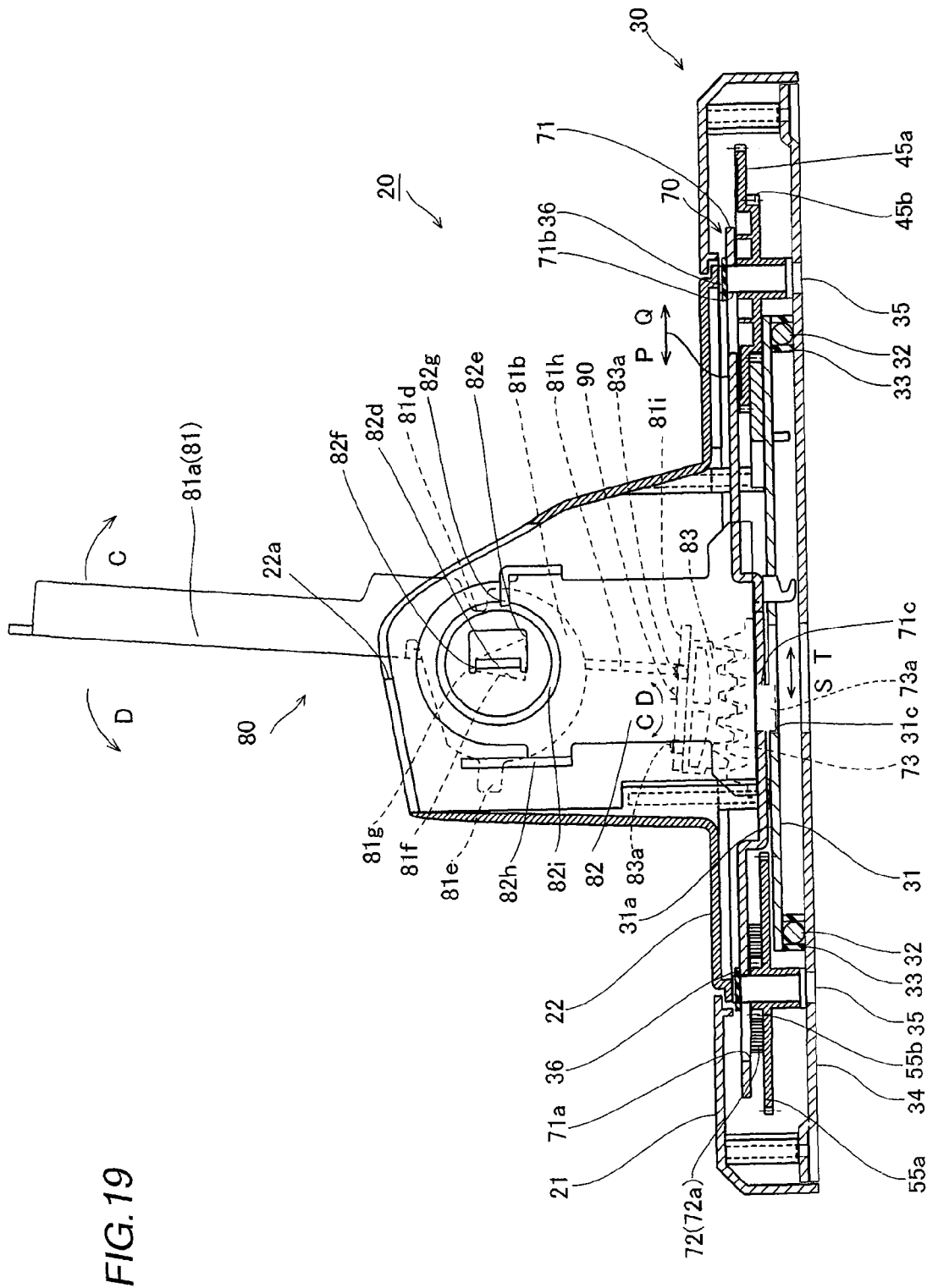
FIG. 19 is a sectional view for illustrating an upward turning operation (along arrow C) of the display screen turning apparatus according to the embodiment of the present invention shown in FIG. 1.

The plate member 71 so moves along arrow P that the rack gear 73 also moves along arrow P following the plate member 71, as shown in FIG. 19. Thus, when the rack gear 73 moves along arrow S, the rotating gear 83 meshing with the rack gear 73 is rotated along arrow C while maintaining the meshing state. Consequently, the display screen support member 81 is turned upward (along arrow C) at a prescribed rotational frequency. At this time, the display screen support member 81 is rotated around the upper surfaces 82*f* of the support shafts 82*d* serving as rotation centers while the base portions 81*g* of the sectorial holes 81*f* of the display screen support member 81 and the upper surfaces 82*f* of the support shafts 82*d* of the vertical support members 82 are in contact with each other.

When turning the display body 10 (see FIG. 1) along arrow C up to a desired angle, the user releases the upward tilt button (not shown) of the attached remote control (not shown), so that the signal for turning the display body 10 upward (along arrow C) is not transmitted to the control circuit portion (not shown) of the display body 10 and the driving of the stepping motor 52 is stopped. Thus, the display screen support member 81 stops turning along arrow C and stands still.

When the user continuously turns the display body 10 (see FIG. 1) upward (along arrow C), first end portions of the inner side surfaces of the slots 71*a* and 71*b* of the plate member 71 come into contact with the side surfaces of the boss members 35 respectively thereby regulating sliding of the rack plate 70 along arrow P, as shown in FIG. 19. Therefore, the display body 10 stops turning along arrow C and stands still. At this time, the stepping motor 52 is continuously driven, and hence the driving torque transmitted from the stepping motor 52 is transmitted to the driving gear 61 of the torque limiter 60 through the worm gear 57 and the gear 53.

According to this embodiment, the driving gear 61 is brought into pressure contact with the driven gear 62 by the coil spring 63 with the previously set urging force. When driving torque exceeding the frictional force between the engaging portion 61*l* of the driving gear 61 and the outer peripheral surfaces 62*e* of the fragment portions 62*b* of the driven gear 62 following the pressure contact force of the coil spring 63 is generated with respect to the driving gear 61, therefore, the engaging portion 61*l* of the driving gear 61 and the outer peripheral surfaces 62*e* of the fragment portions 62*b* of the driven gear 62 so slip that the driving torque of the driving gear 61 is not transmitted to the driven gear 62. In other words, the rotation of the driven gear 62 is stopped regardless of the rotation of the driving gear 61. Thus, the driving torque is not transmitted to the driven gear 62, the gears 54 and 55 and the rack gear 72 subsequent to the driving gear 61 of the torque limiter 60. When the movement (sliding) of the rack plate 70 along arrow P is stopped, therefore, the rotation is stopped regardless of the driving of the stepping motor 52.

On the other hand, the user presses a downward tilt button (not shown) of the attached remote control (not shown), thereby transmitting a signal for turning the display body 10 (see FIG. 1) downward (along arrow D in FIG. 1) to the control circuit portion (not shown) of the display body 10 and driving the stepping motor 52 of the display screen turning apparatus 20. Thus, the worm gear 57 mounted on the stepping motor 52 is rotated, and the driving gear 61 of the torque limiter 60 is rotated along arrow F1 through the gear 53, as shown in FIG. 3. The driven gear 62 of the torque limiter 60 is rotated along arrow F1, and the gear 55 is rotated along arrow F2 through the gear 54. The rack plate 70 moves along arrow Q with the rack gear 72.

Figure 20:
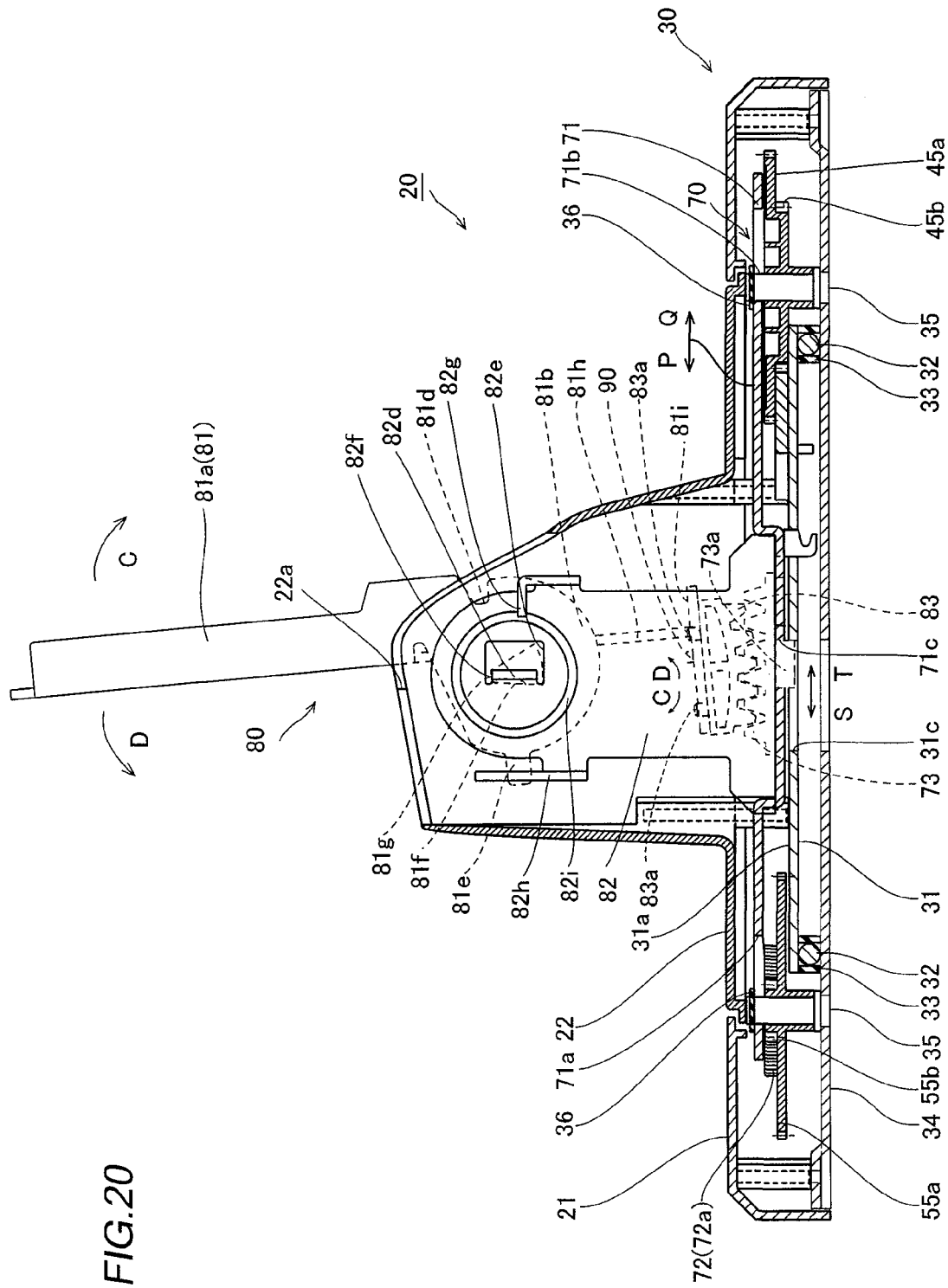
FIG. 20 is a sectional view for illustrating a downward turning operation (along arrow D) of the display screen turning apparatus according to the embodiment of the present invention shown in FIG. 1.

The plate member 71 so moves along arrow Q that the rack gear 73 also moves along arrow T following the plate member 71, as shown in FIG. 20. Thus, when the rack gear 73 moves along arrow T, the rotating gear 83 meshing with the rack gear 73 is rotated along arrow D while maintaining the meshing state. Consequently, the display screen support member 81 is turned downward (along arrow D) at the prescribed rotational frequency. At this time, the display screen support member 81 is rotated around the upper surfaces 82f of the support shafts 82d serving as rotation centers while the base portions 81g of the sectorial holes 81f of the display screen support member 81 and the upper surfaces 82f of the support shafts 82d of the vertical support members 82 are in contact with each other.

When turning the display body 10 (see FIG. 1) along arrow D up to a desired angle, the user releases the downward tilt button (not shown) of the attached remote control (not shown), so that the signal for turning the display body 10 downward (along arrow D) is not transmitted to the control circuit portion (not shown) of the display body 10 and the driving of the stepping motor 52 is stopped. Thus, the display screen support member 81 stops turning along arrow D and stands still.

When the user continuously turns the display body 10 (see FIG. 1) downward (along arrow D), second end portions of the inner side surfaces of the slots 71a and 71b of the plate member 71 come into contact with the side surfaces of the boss members 35 respectively thereby regulating sliding of the rack plate 70 along arrow Q, as shown in FIG. 20. Therefore, the display body 10 stops turning along arrow D and stands still.

While the stepping motor 52 (see FIG. 3) is continuously driven at this time, the engaging portion 61l of the driving gear 61 and the outer peripheral surfaces of the fragment portions 62b of the driven gear 62 slip when driving torque exceeding the frictional force between the engaging portion 61l of the driving gear 61 and the outer peripheral surfaces 62e of the fragment portions 62b of the driven gear 62 following the pressure contact force of the coil spring 63 is generated with respect to the driving gear 61, so that the driving torque of the driving gear 61 is not transmitted to the driven gear 62. In other words, the rotation of the driven gear 62 is stopped regardless of the rotation of the driving gear 61. Thus, the driving torque is not transmitted to the driven gear 62, the gears 54 and 55 and the rack gear 72 subsequent to the driving gear 61 of the torque limiter 60. When the movement (sliding) of the rack plate 70 along arrow Q is stopped, therefore, the rotation is stopped regardless of the driving of the stepping motor 52.

The horizontal turning operation of the display screen turning apparatus 20 in the horizontal plane is now described.

First, the user presses a horizontal turn button (not shown) of the attached remote control (not shown), thereby transmitting a signal for turning the display body 10 (see FIG. 1) leftward (along arrow A in FIG. 1) to the control circuit portion (not shown) of the display body 10 and driving the stepping motor 42 of the display screen turning apparatus 20. More specifically, the worm gear 47 mounted on the stepping motor 42 is rotated following the driving of the stepping motor 42 and the driving gear 61 of the torque limiter 60 is rotated along arrow E3 through the gear 43, as shown in FIG. 3. The driven gear 62 of the torque limiter 60 is rotated along arrow E3, and the turning gear member 48 is rotated along arrow E4 through the gears 44 and 45. Thus, the turntable 31 provided on the base portion 30 mounted with the display screen support member 81 turns along arrow G1, thereby turning the display body 10 leftward (along arrow A in FIG. 1) at a prescribed rotational speed. At this time, the rotating gear 83 fixed to the display screen support member 81 is also rotated along arrow H1 following the turning of the display screen support member 81. Further, the rack gear 73 (see FIG. 4) so arranged as to mesh with the rotating gear 83 is also rotated following the rotation of the rotating gear 83 while maintaining the meshing state.

Figure 21:
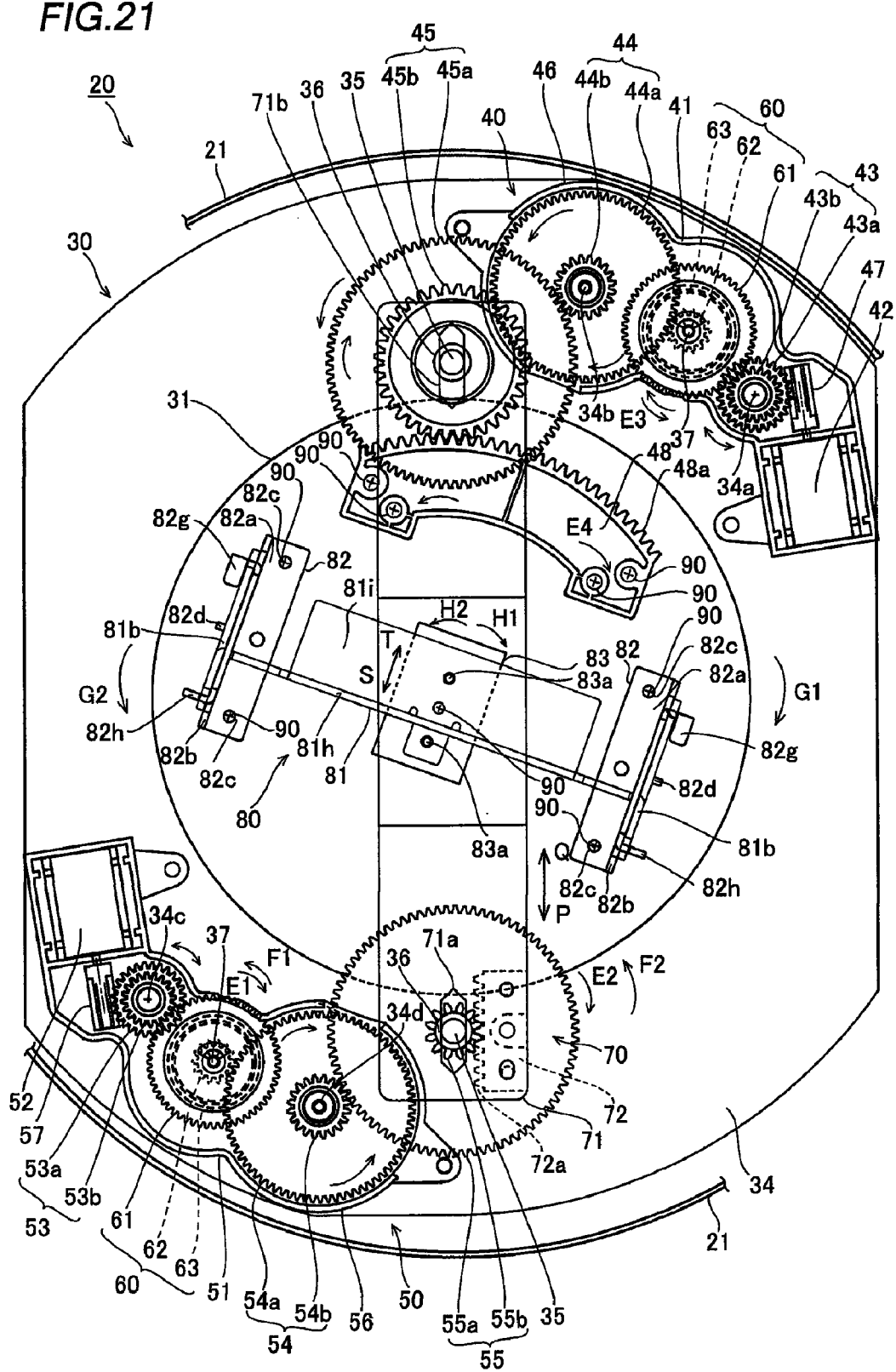
FIG. 21 is a plan view for illustrating a leftward turning operation (along arrow A in FIG. 1) of the display screen turning apparatus according to the embodiment of the present invention shown in FIG. 1.

When turning the display body 10 (see FIG. 1) up to a desired angle, the user releases the horizontal turn button (not shown) of the attached remote control (not shown), so that the signal for turning the display body 10 leftward (along arrow A in FIG. 1) is not transmitted to the control circuit portion (not shown) of the display body 10 and the driving of the stepping motor 42 is stopped. Thus, the base portion 30 stops turning along arrow G1 and stands still, as shown in FIG. 21.

When the turning angle of the base portion 30 reaches the maximum (30° in this embodiment) while the user continuously turns the display body 10 (see FIG. 1) leftward (along arrow A in FIG. 1), the turntable 31 comes into contact with a stopper member (not shown) provided in the base portion 30, so that the leftward turning (along arrow A in FIG. 1) is regulated. Therefore, the base portion 30 stops turning along arrow G1 and stands still.

While the stepping motor 42 is continuously driven at this time, the engaging portion 61l of the driving gear 61 and the outer peripheral surfaces of the fragment portions 62b of the driven gear 62 slip when driving torque exceeding the frictional force between the engaging portion 61l of the driving gear 61 and the outer peripheral surfaces 62e of the fragment portions 62b of the driven gear 62 following the pressure contact force of the coil spring 63 is generated with respect to the driving gear 61, so that the driving torque of the driving gear 61 is not transmitted to the driven gear 62. In other words, the rotation of the driven gear 62 is stopped regardless of the rotation of the driving gear 61. Thus, the driving torque is not transmitted to the driven gear 62, the gears 44 and 45 and the turning gear member 48 subsequent to the driving gear 61 of the torque limiter 60. When the turntable 31 comes into contact with the stopper member (not shown), therefore, the rotation is stopped regardless of the driving of the stepping motor 42.

While the above turning operation has been described with reference to the case of turning the base portion 30 along arrow G1 in FIG. 3, the horizontal turning/driving portion 40 performs a turning operation similar to the above also in a case of oppositely turning the turntable 31 along arrow G2. Therefore, the display body 10 (see FIG. 1) can be turned rightward (along arrow B in FIG. 1) by turning the turntable 31 along arrow G2.

According to this embodiment, as hereinabove described, the display screen turning apparatus 20 comprises the driven gear 62 having the spring storage portion 62d enclosed with the plurality of fragment portions 62b, the driving gear 61 having the fit portion 61k fitted with the outer peripheral surfaces 62e of the plurality of fragment portions 62b of the driven gear 62 and the coil spring 63 bringing the plurality of fragment portions 62b into pressure contact with the fit portion 61k of the driving gear 61 for transmitting the driving torque in response to the pressure contact force applied by the coil spring 63, whereby the driving torque responsive to the pressure contact force applied by the coil spring 63 can be transmitted while the plurality of fragment portions 62b of the driven gear 62 an the fit portion 61k of the driving gear 61 are directly in surface contact with each other due to the coil spring 63. Thus, no frictional member such as a felt member may be separately provided, whereby increase in the number of components can be suppressed. Further, the driving torque is so transmitted in response to the pressure contact force applied by the coil spring 63 that the pressure contact force applied by the coil spring 63 has the same magnitude regardless of the direction of rotation of the driving gear 61 and the driven gear 62, whereby bidirectional rotation can be transmitted.

According to this embodiment, the driving gear 61 is fitted with the driven gear 62 by bringing the plurality of fragment portions 62b of the driven gear 62 into pressure contact with the fit portion 61k of the driving gear 61 having the lid portion 61b arranged to cover the spring storage portion 62d into which the coil spring 63 is press-fitted, whereby the driving gear 61 is hardly detached from the driven gear 62. Thus, the lid portion 61b of the driving gear 61 covers the spring storage portion 62d when the driven gear 61 is fitted with the driven gear 62, whereby the coil spring 63 can be inhibited from slipping out of the spring storage portion 62d. Dissimilarly to a case where a stop hook is provided on the spring storage portion 62d for inhibiting the coil spring 63 from slipping out of the spring storage portion 62d, the coil spring 63 may not be press-fitted into the spring storage portion 62d while avoiding a hook when the driven gear 62 and the coil spring 63 are combined with each other, whereby the driven gear 62 and the coil spring 63 can be easily combined with each other.

According to this embodiment, the driven gear 62 has the shaft receiving portion 62g at the center thereof, the driving gear 61 has the shaft receiving portion 61d provided at the center thereof to correspond to the shaft receiving portion 62g, and the display screen turning apparatus 20 comprises the fixed shaft 37 inserted into the shaft receiving portions 62g and 61d of the driven gear 62 and the driving gear 61 for rotatably supporting the driven gear 62 and the driving gear 61 so that the centers of the driven gear 62 and the driving gear 61 are fixed by the fixed shaft 37 dissimilarly to a case where the fixed shaft 37 is not inserted into the driven gear 62 or the driving gear 61, whereby the driven gear 62 and the driving gear 61 do not deviate from ordinary positions even if force is applied to the driven gear 62 or the driving gear 61 from a direction other than that perpendicular to the fixed shaft 37. Thus, nontransmission of the driving torque resulting from deviation of the driven gear 62 or the driving gear 61 from the ordinary position can be suppressed.

According to this embodiment, the fixed shaft 37 is provided with the groove portion 37a peripherally formed on the outer peripheral surface 62e thereof and the shaft receiving portion 61d is integrally provided with the protrusion 61j, so that the fixed shaft 37 and the shaft receiving portion 61d engage with each other thereby regulating movement of the driving gear 61 provided with the shaft receiving portion 61d in the extensional direction (along arrows Z1 and Z2 in FIG. 9) of the fixed shaft 37. The driven gear 62 and the driving gear 61 are pivotally supported by the fixed shaft 37, whereby the extensional direction of the fixed shaft 37 and the direction for fitting the driving gear 61 with the driven gear 62 are identical to each other. Thus, movement of the driving gear 61 in the direction fitted with the driven gear 62 is regulated due to the engagement between the shaft receiving portion 61d and the fixed shaft 37 so that the driving gear 61 is more hardly detached from the driven gear 62, whereby the coil spring 63 can be more inhibited from slipping out of the spring storage portion 62d of the driven gear 62 due to the lid portion 61b of the driving gear 61. Further, the fixed shaft 37 and the shaft receiving portion 61d are integrally provided with the groove portion 37a and the protrusion 61j respectively so that no member for engaging the fixed shaft 37 and the shaft receiving portion 61d with each other may be separately provided, whereby increase in the number of components can be suppressed.

According to this embodiment, the shaft receiving portion 61d is provided with the protrusion 61j rotatably engaging with the groove portion 37a of the fixed shaft 37 so that the protrusion 61j of the driving gear 61 can move in the groove portion 37a peripherally formed on the outer peripheral surfaces 62e of the fixed shaft 37 while the driving gear 61 is rotated with respect to the fixed shaft 37, whereby the engaging state between the groove portion 37a and the protrusion 61j can be easily maintained while rotating the driving gear 61 with respect to the fixed shaft 37.

According to this embodiment, the engaging support portion 61h of the shaft receiving portion 61d is formed to be elastically deformable in the direction (along arrow U in FIG. 11) where the protrusion 61j separates from the groove portion 37a of the fixed shaft 37, whereby the driving gear 61 can be easily attached to and detached from the fixed shaft 37 by elastically deforming the engaging support portion 61 so that the protrusion 61j separates from the groove portion 37a.

According to this embodiment, the shaft receiving portion 61d is provided with the pair of groove portions 61f and the engaging support portion 61h formed to be elastically deformable in the region held between the pair of groove portions 61f so that the engaging support portion 61h provided with the protrusion 61j can be elastically deformed by the pair of groove portions 61f, whereby the driving gear 61 can be more easily attached to and detached from the fixed shaft 37.

According to this embodiment, the protrusion 61j of the engaging support portion 61h is formed in the vicinity of the upper end portion 61i of the engaging support portion 61h in the insertion direction (along arrow Z1) for the fixed shaft 37, whereby the quantity of elastic deformation of the engaging support portion 61h can be increased. Thus, the engaging support portion 61h is easily elastically deformable in the direction (along arrow U) for separating from the groove portion 37a of the fixed shaft 37, whereby the driving gear 61 can be more easily attached to and detached from the fixed shaft 37.

According to this embodiment, the upper end portion 61i of the engaging support portion 61h is so formed as to protrude upward beyond the upper end portion of the shaft receiving portion 61d other than the engaging support portion 61h and the upper end portion 37b of the fixed shaft 37 when the fixed shaft 37 is inserted into the shaft receiving hole 61 so that a finger or the like can be easily put on the upper end portion 61i of the engaging support portion 61h in the state where the fixed shaft 37 is inserted into the shaft receiving hole 61c, whereby the protrusion 61j can be easily elastically deformed in the direction (along arrow U) for separating from the groove portion 37a of the fixed shaft 37. Thus, the driving gear 61 can be more easily attached to and detached from the fixed shaft 37.

According to this embodiment, the inclined portion 37c is formed on the outer periphery of the upper end portion 37b of the fixed shaft 37 in the insertion direction (along arrow Z1) for the fixed shaft 37 by chamfering the outer periphery of the upper end portion 37b so that the protrusion 61j comes into contact with the inclined portion 37c of the fixed shaft 37 and moves outward along the surface of the inclined portion 37c when the fixed shaft 37 is inserted into the shaft receiving hole 61c, whereby the engaging support portion 61h can be easily elastically deformed outward. Thus, the protrusion 61j of the engaging support portion 61h and the groove portion 37a of the fixed shaft 37 can smoothly engage with each other. Further, a clearance can be formed between the outer periphery of the upper end portion 37b of the fixed shaft 37 and the upper end portion 61i of the engaging support portion 61h when the fixed shaft 37 is inserted into the shaft receiving hole 61c, whereby a finger or the like can be more easily put on the upper end portion 61i of the engaging support portion 61h. Thus, the driving gear 61 can be more easily detached from the fixed shaft 37.

According to this embodiment, the hole 61g for rendering the engaging support portion 61h deflectable is provided on the outer peripheral surface side of the engaging support portion 61h of the shaft receiving portion 61d so that the shaft receiving portion 61d can be easily deflected in the direction (along arrow U) for separating from the groove portion 37a of the fixed shaft 37, whereby the driving gear 61 can be more easily attached to and detached from the fixed shaft 37.

According to this embodiment, the driven gear 62 integrally includes the gear portion 62a and the driving gear 61 integrally includes the gear portion 61a, whereby the driving torque transmitted to the driving gear 61 can be easily transmitted to still another rotating member from the driven gear 62 through the gear portions 62a and 61a.

According to this embodiment, the inclined portion 61m is formed on the inner peripheral surface side of the lower end portion of the engaging portion 61l by chamfering the lower end portion of the engaging portion 61l along the inner peripheral surface so that the driving gear 61 can be fitted with the driven gear 62 by sliding the upper end portions of the plurality of fragment portions 62b along the inclined portion 61m, whereby the driving gear 61 can be easily fitted with the driven gear 62.

According to this embodiment, the inclined portions 62i are formed on the sides of the outer peripheral surfaces 62e of the upper end portions of the plurality of fragment portions 62b by chamfering the upper end portions of the plurality of fragment portions 62b along the outer peripheral surfaces 62e so that the driving gear 61 can be fitted with the driven gear 62 by sliding the lower end portion of the engaging portion 61i along the inclined portions 62i, whereby the driving gear 61 can be easily fitted with the driven gear 62.

According to this embodiment, the surface 61k of the protrusion 61j opposed to the bottom surface of the peripheral groove portion 37a of the fixed shaft 37 is arcuately formed to correspond to the bottom surface of the peripheral groove portion 37a of the fixed shaft 37 so that the protrusion 61j of the shaft receiving portion 61d can be fitted into the peripheral groove portion 37a of the fixed shaft 37 along the bottom surface thereof, whereby the protrusion 61j can be more deeply fitted into the groove portion 37a without inhibiting the rotation of the driving gear 61 with respect to the fixed shaft 37.

Although the present invention has been described and illustrated in detail, it is clearly understood that the same is by way of illustration and example only and is not to be taken by way of limitation, the spirit and scope of the present invention being limited only by the terms of the appended claims.

For example, while the present invention is applied to the display screen turning apparatus 20 for a liquid crystal display employed as an exemplary television set in the aforementioned embodiment, the present invention is not restricted to this but is also applicable to a display screen turning apparatus for a television set having a display screen portion such as an organic EL panel other than the liquid crystal panel.

While the eight fragment portions 62b of the driven gear 62 are provided at the equiangular intervals of 45° in the aforementioned embodiment, the present invention is not restricted to this but the fragment portions 62b of the driven gear 62 may not be provided at equiangular intervals. Further, the fragment portions 62b of the driven gear 62 may be provided in a number other than eight.

While the lid portion 61b of the driving gear 61 is provided over the entire upper surface of the driving gear 61 in the aforementioned embodiment, the present invention is not restricted to this but the lid portion 61b may alternatively be provided only on a part of the upper surface of the driving gear 61, so far as the same can inhibit the coil spring 63 from slipping upward (along arrow Z1 in FIG. 9).

While the driving torque of the driving gear 61 (second rotating member) is transmitted to the driven gear 62 (first rotating member) in the aforementioned embodiment, the present invention is not restricted to this but the driving torque of the first rotating member may alternatively be transmitted to the second rotating member.

What is claimed is:

1. A torque limiter comprising:
   a first rotating member integrally provided with a plurality of fragment portions in a concentric manner and having a spring storage portion enclosed with said plurality of fragment portions;
   a second rotating member having a lid portion arranged to cover said spring storage portion of said first rotating member and a fit portion fitted with the outer peripheral surfaces of said plurality of fragment portions of said first rotating member;
   a spring member press-fitted into said spring storage portion enclosed with the inner peripheral surfaces of said plurality of fragment portions of said first rotating member thereby bringing said plurality of fragment portions into pressure contact with said fit portion of said second rotating member,
   for transmitting driving torque in response to pressure contact force applied by said spring member, wherein
   said first rotating member further has a first shaft receiving portion at the center of said first rotating member while said second rotating member further has a second shaft receiving portion provided at the center of said second rotating member to correspond to said first shaft receiving portion;
   the torque limiter further comprises a fixed shaft portion inserted into said first shaft receiving portion of said first rotating member and said second shaft receiving portion of said second rotating member for rotatably supporting said first rotating member and said second rotating member;
   said fixed shaft portion is integrally provided with a first engaging portion, and said second shaft receiving portion is integrally provided with a second engaging portion rotatably engaging with said first engaging portion of said fixed shaft portion; and
   said first engaging portion is a groove portion peripherally provided on the outer peripheral surface of said fixed shaft portion, and said second engaging portion is a protrusion engaging with said groove portion.

2. The torque limiter according to claim 1, wherein said second shaft receiving portion is formed to be elastically deformable in a direction where said protrusion separates from said groove portion of said fixed shaft portion.

3. The torque limiter according to claim 2, wherein said second shaft receiving portion includes a pair of notches and an engaging support portion provided with said protrusion and formed to be elastically deformable in a region held between said pair of notches.

4. The torque limiter according to claim 3, wherein
said protrusion of said engaging support portion is formed on a portion of said engaging support portion on a side in an insertion direction for said fixed shaft portion.

5. The torque limiter according to claim 3, wherein
in an insertion direction for said fixed shaft portion, an end portion of said engaging support portion of said second shaft receiving portion protrudes beyond an end portion of a portion other than said engaging support portion of said second shaft receiving portion.

6. The torque limiter according to claim 3, wherein
an end portion of said engaging support portion on a side in an insertion direction for said fixed shaft portion is so formed as to protrude beyond a forward end portion on the side in said insertion direction for said fixed shaft portion when said fixed shaft portion is inserted into said second shaft receiving portion.

7. The torque limiter according to claim 2, wherein
a first chamfer is formed on the outer periphery of a forward end portion on a side in an insertion direction for said fixed shaft portion.

8. The torque limiter according to claim 3, wherein
a hole for rendering said engaging support portion deflectable is provided on the outer peripheral surface side of said engaging support portion of said second shaft receiving portion.

9. The torque limiter according to claim 1, wherein
said first rotating member integrally includes a driven gear portion, and said second rotating member integrally includes a driving gear portion.

10. The torque limiter according to claim 1, wherein
said fit portion of said second rotating member is formed to be fitted with the outer peripheral surfaces of said plurality of fragment portions of said first rotating member from above, and
a second chamfer is formed on the inner peripheral surface side of the lower portion of said fit portion.

11. The torque limiter according to claim 1, wherein
said fit portion of said second rotating member is formed to be fitted with the outer peripheral surfaces of said plurality of fragment portions of said first rotating member from above, and
third chamfers are formed on the outer peripheral surface sides of the upper end portions of said plurality of fragment portions.

12. The torque limiter according to claim 1, wherein
a surface of said protrusion of said second shaft receiving portion opposed to the bottom surface of said peripheral groove portion of said fixed shaft portion is arcuately formed to correspond to the bottom surface of said peripheral groove portion of said fixed shaft portion.

13. A display screen turning apparatus comprising a torque limiter including a first rotating member integrally provided with a plurality of fragment portions in a concentric manner and having a spring storage portion enclosed with said plurality of fragment portions, a second rotating member having a lid portion arranged to cover said spring storage portion of said first rotating member and a fit portion fitted with the outer peripheral surfaces of said plurality of fragment portions of said first rotating member and a spring member press-fitted into said spring storage portion enclosed with the inner peripheral surfaces of said plurality of fragment portions of said first rotating member thereby bringing said plurality of fragment portions into pressure contact with said fit portion of said second rotating member for transmitting driving torque in response to pressure contact force applied by said spring member, for supporting a display screen portion in a turnable manner, wherein
said first rotating member further has a first shaft receiving portion at the center of said first rotating member, said second rotating member further has a second shaft receiving portion provided at the center of said second rotating member to correspond to said first shaft receiving portion;
said torque limiter further includes a fixed shaft portion inserted into said first shaft receiving portion of said first rotating member and said second shaft receiving portion of said second rotating member for rotatably supporting said first rotating member and said second rotating member; and
said fixed shaft portion is integrally provided with a groove portion peripherally provided on the outer peripheral surface of said fixed shaft portion, and said second shaft receiving portion is integrally provided with a protrusion rotatably engaging with said groove portion of said fixed shaft portion.

14. The display screen turning apparatus according to claim 13, wherein
said second shaft receiving portion is formed to be elastically deformable in a direction where said protrusion separates from said groove portion of said fixed shaft portion.

15. A television set comprising:
a display screen portion displaying a television image; and
a display screen turning apparatus including a torque limiter including a first rotating member integrally provided with a plurality of fragment portions in a concentric manner and having a spring storage portion enclosed with said plurality of fragment portions, a second rotating member having a lid portion arranged to cover said spring storage portion of said first rotating member and a fit portion fitted with the outer peripheral surfaces of said plurality of fragment portions of said first rotating member and a spring member press-fitted into said spring storage portion enclosed with the inner peripheral surfaces of said plurality of fragment portions of said first rotating member thereby bringing said plurality of fragment portions into pressure contact with said fit portion of said second rotating member for transmitting driving torque in response to pressure contact force applied by said spring member, for supporting said display screen portion in a turnable manner, wherein
said first rotating member further has a first shaft receiving portion at the center of said first rotating member, said second rotating member further has a second shaft receiving portion provided at the center of said second rotating member to correspond to said first shaft receiving portion;
said torque limiter further includes a fixed shaft portion inserted into said first shaft receiving portion of said first rotating member and said second shaft receiving portion of said second rotating member for rotatably supporting said first rotating member and said second rotating member; and
said fixed shaft portion is integrally provided with a groove portion peripherally provided on the outer peripheral surface of said fixed shaft portion, and said second shaft receiving portion is integrally provided with a protrusion rotatable engaging with said groove portion of said fixed shaft portion.

* * * * *